United States Patent
Hara

(10) Patent No.: US 11,001,708 B2
(45) Date of Patent: May 11, 2021

(54) LIQUID CRYSTAL POLYESTER RESIN COMPOSITION AND MOLDED ARTICLE

(71) Applicant: SUMITOMO CHEMICAL COMPANY, LIMITED, Tokyo (JP)

(72) Inventor: Tomoyuki Hara, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/626,792

(22) PCT Filed: Jun. 27, 2018

(86) PCT No.: PCT/JP2018/024422
§ 371 (c)(1),
(2) Date: Dec. 26, 2019

(87) PCT Pub. No.: WO2019/009161
PCT Pub. Date: Jan. 10, 2019

(65) Prior Publication Data
US 2020/0115546 A1    Apr. 16, 2020

(30) Foreign Application Priority Data
Jul. 4, 2017   (JP) .............................. JP2017-131309

(51) Int. Cl.
*C08L 67/04*   (2006.01)

(52) U.S. Cl.
CPC ......... *C08L 67/04* (2013.01); *C08L 2205/025* (2013.01); *C08L 2205/12* (2013.01)

(58) Field of Classification Search
CPC . C08L 67/04; C08L 2205/12; C08L 2205/025
See application file for complete search history.

(56) References Cited

U.S. PATENT DOCUMENTS

| | | | |
|---|---|---|---|
| 2002/0017631 A1 | 2/2002 | Maeda et al. | |
| 2003/0168634 A1* | 9/2003 | Yamauchi | H01R 13/46 252/299.01 |
| 2006/0025561 A1 | 2/2006 | Watanabe et al. | |

(Continued)

FOREIGN PATENT DOCUMENTS

| JP | 01-284547 A | 11/1989 |
|---|---|---|
| JP | 06-240114 A | 8/1994 |

(Continued)

OTHER PUBLICATIONS

International Search Report issued in corresponding International Patent Application No. PCT/JP2018/024422, dated Oct. 2, 2018, with English translation.

(Continued)

*Primary Examiner* — Robert D Harlan
(74) *Attorney, Agent, or Firm* — McDermott Will & Emery LLP

(57) ABSTRACT

This liquid crystal polyester resin composition includes a liquid crystal polyester resin and a filler composed of a fibrous filler and a plate-like filler, in which the amount of the filler is at least 15 parts by mass but not more than 55 parts by mass per 100 parts by mass of the liquid crystal polyester resin, and the number average fiber length of the fibrous filler is at least 450 μm but not more than 700 μm.

19 Claims, 4 Drawing Sheets

(56) References Cited

U.S. PATENT DOCUMENTS

| | | | |
|---|---|---|---|
| 2011/0114884 A1 | 5/2011 | Fukuhara et al. | |
| 2012/0104315 A1* | 5/2012 | Fukuhara | C09K 19/52 |
| | | | 252/299.5 |
| 2013/0082206 A1 | 4/2013 | Fukuhara et al. | |
| 2019/0161608 A1 | 5/2019 | Komori | |

FOREIGN PATENT DOCUMENTS

| | | |
|---|---|---|
| JP | 2001-288342 A | 10/2001 |
| JP | 2003-268252 A | 9/2003 |
| JP | 2006-037061 A | 2/2006 |
| JP | 2009-191088 A | 8/2009 |
| JP | 2010-138228 A | 6/2010 |
| JP | 2011-122148 A | 6/2011 |
| JP | 2013-072070 A | 4/2013 |
| WO | 2017/191828 A1 | 11/2017 |
| WO | 2018/066416 A1 | 4/2018 |
| WO | 2018/074156 A1 | 4/2018 |

OTHER PUBLICATIONS

Japanese Notice of Reasons for Refusal issued in corresponding Japanese Patent Application No. 2017-131309, dated Mar. 16, 2021, with English translation.

\* cited by examiner

LIQUID CRYSTAL POLYESTER RESIN COMPOSITION AND MOLDED ARTICLE

The present invention relates to a liquid crystal polyester resin composition and a molded article.

CROSS REFERENCE TO RELATED APPLICATIONS

This application is the U.S. National Phase under 35 U.S.C. § 371 of International Application, No. PCT/JP2018/024422, filed on Jun. 27, 2018, which claims the benefit of Japanese Application No. 2017-131309, filed on Jul. 4, 2017, the entire contents of each are hereby incorporated by reference.

BACKGROUND ART

Liquid crystal polyester resins have excellent moldability and superior heat resistance. In order to utilize these types of properties, liquid crystal polyester resins are mainly used in applications for electronic components such as connectors, relays and bobbins. In recent years electronic components have seen much progress in terms of increased levels of integration, increased miniaturization, reduced wall thickness and improved thinness, and particularly in the case of connector components, the trends towards increased miniaturization and reduced wall thickness have been remarkable.

Representative examples of these thin-walled connectors include board-to-board connectors used for connecting printed circuit board substrates together, and flexible printed circuit (FPC) connectors used for connecting a flexible printed circuit board or a flexible flat cable (FFC) to a printed circuit board.

As the electronic devices that use the printed circuit boards are reduced in size, board-to-board connectors and FPC connectors also require miniaturization. For example, narrow-pitch connectors in which the pitch between the metal terminals of the connector have been narrowed to 0.35 mm to 0.4 mm have been proposed. Further, thin connectors in which the height of the connector in an installed state (the so-called stacking height) is from 0.6 mm to 1.0 mm have also been proposed.

However, attempting to meet the demands for increasingly miniaturized and thin-walled connectors increases the possibility of short shots caused by insufficient fluidity of the resin during molding of the connector. Consequently, there is a need for further improvement in the fluidity of the resin in thin-walled portions of the molded article (thin-wall fluidity).

Furthermore, attempting to meet the demands for increasingly miniaturized and thin-walled connectors increases the possibility of weakening of the connector strength due to the thinner walls, making it impossible to maintain a practical degree of strength. Specifically, there is an increased possibility of connector deformation caused by impact during transport and handling of the connector.

In a similar manner, the hardness of the connector decreases as a result of the thinner walls, and there is a possibility that damage may occur during handling of the connector. Examples of the type of damage that may occur during handling of the connector include connector collapse caused by positional misalignment during installation of the connector. Consequently, improvements in the hardness of the connector would be desirable.

Moreover, attempting to meet the demands for increasingly miniaturized and thin-walled connectors means there is a possibility of the following phenomenon occurring even with a small amount of warping. For example, if warping occurs in the connector, then a gap may develop between a metal terminals and the circuit formed on the substrate. Then, during soldering, the molten solder is sometimes unable to be retained in a satisfactory amount in the gap between the metal terminal and the substrate, meaning the solder hardens in a state where the metal terminal and the circuit are separated. As a result, the metal terminal and the circuit cannot be electrically connected, leading to the possibility of connection faults.

Therefore, the forming materials for thin-wall connectors typified by board-to-board connectors and FPC connectors must have excellent thin-wall fluidity, and be capable of producing a molded article having superior strength and hardness and low warping. In the present embodiments, "low warping" means the level of warping of the molded article, determined on the basis of the least squares plane of the molded article, is small.

In response to these types of demands, Patent Document 1 discloses a liquid crystal polyester resin composition having excellent fluidity and a high weld strength. The liquid crystal polyester resin composition disclosed in Patent Document 1 is composed of 98 to 20% by mass of a liquid crystal polyester, 1 to 79% by mass of a plate-like or granular filler, and 1 to 79% by mass of glass fiber. Further, the liquid crystal polyester used has a heat distortion temperature of 190 to 280° C., a flow start temperature of not more than 330° C. and a melt viscosity of not more than 10,000 poise, and forms an anisotropic melt phase.

PRIOR ART LITERATURE

Patent Document

Patent Document 1: JP H01-284547-A

SUMMARY OF INVENTION

Problems to be Solved by the Invention

In the conventional technology such as that disclosed in Patent Document 1, although investigations have been conducted with the aim of improving the mechanical strength, and particularly the weld strength, of the liquid crystal polyester resin composition, no investigations focused on hardness have been conducted. In Patent Document 1, considering the fact that the blend amount of fillers is usually reduced to obtain superior fluidity, the hardness of the molded article may not necessarily have been sufficient.

In this manner, although various investigations have been undertaken in relation to liquid crystal polyester resin compositions used in small and thin-walled connectors, the conventional technology is still not entirely satisfactory, and further improvements are still required.

Further, it is assumed that the above problems will occur not only in small molded articles.

The present invention has been developed in light of these circumstances, and has an object of providing a liquid crystal polyester resin composition that has excellent thin-wall fluidity and is capable of producing a molded article having little warping and superior hardness. Further, the invention also has an object of providing a molded article having little warping and superior hardness that is obtained by molding the liquid crystal polyester resin composition.

Means for Solving the Problems

In order to achieve the above objects, one aspect of the present invention provides a liquid crystal polyester resin composition including at least 15 parts by mass but not more than 55 parts by mass of a filler composed of a fibrous filler and a plate-like filler per 100 parts by mass of a liquid crystal polyester resin, in which the number average fiber length of the fibrous filler is at least 450 μm but not more than 700 μm.

In one aspect of the present invention, the deflection temperature under load, measured in accordance with ASTM D648 under a load of 1.82 MPa using a test piece prepared by molding the liquid crystal polyester resin composition, may be at least 260° C. but less than 285° C.

In one aspect of the present invention, the Rockwell hardness, measured using the R scale in accordance with ASTM D785 using a test piece prepared by molding the liquid crystal polyester resin composition, may be at least 108 but not more than 115.

In one aspect of the present invention, the liquid crystal polyester resin composition includes at least 24 parts by mass but not more than 45 parts by mass of the filler per 100 parts by mass of the liquid crystal polyester resin, and the ratio (W1/W2) between the fibrous filler content (W1) and the plate-like filler content (W2) may be at least 0.5 but not more than 2.0.

In one aspect of the present invention, the volume average particle size of the plate-like filler may be at least 5 μm but not more than 50 μm.

In one aspect of the present invention, the liquid crystal polyester resin may be a mixture of a plurality of liquid crystal polyester resins having different flow start temperatures, in which among the plurality of liquid crystal polyester resins, the flow start temperature of a first liquid crystal polyester resin having the highest flow start temperature is at least 300° C. but not more than 400° C., and the flow start temperature of a second liquid crystal polyester resin having the lowest flow start temperature is at least 260° C. but not more than 350° C.

One aspect of the present invention provides a molded article formed using the liquid crystal polyester resin composition described above as a forming material.

Other aspects of the present invention include the following.

[1] A liquid crystal polyester resin composition including a liquid crystal polyester resin and a filler composed of a fibrous filler and a plate-like filler, in which the amount of the filler is at least 15 parts by mass but not more than 55 parts by mass per 100 parts by mass of the liquid crystal polyester resin, and the number average fiber length of the fibrous filler is at least 450 μm but not more than 700 μm.

[2] The liquid crystal polyester resin composition according to [1], in which the deflection temperature under load, measured in accordance with ASTM D648 under a load of 1.82 MPa using a test piece prepared by molding the liquid crystal polyester resin composition, is at least 260° C. but less than 285° C.

[3] The liquid crystal polyester resin composition according to [1] or [2], in which the Rockwell hardness, measured using the R scale in accordance with ASTM D785 using a test piece prepared by molding the liquid crystal polyester resin composition, is at least 108 but not more than 115.

[4] The liquid crystal polyester resin composition according to any one of [1] to [3], in which the amount of the filler is at least 24 parts by mass but not more than 45 parts by mass per 100 parts by mass of the liquid crystal polyester resin.

[5] The liquid crystal polyester resin composition according to any one of [1] to [4], in which the ratio (W1/W2) between the mass (W1) of the fibrous filler and the mass (W2) of the plate-like filler is at least 0.5 but not more than 2.0.

[6] The liquid crystal polyester resin composition according to any one of [1] to [5], in which the volume average particle size of the plate-like filler is at least 5 μm but not more than 50 μm.

[7] The liquid crystal polyester resin composition according to any one of [1] to [6], in which the liquid crystal polyester resin is a mixture of a plurality of liquid crystal polyester resins having different flow start temperatures, and among the plurality of liquid crystal polyester resins, the flow start temperature of a first liquid crystal polyester resin having the highest flow start temperature is at least 300° C. but not more than 400° C., and the flow start temperature of a second liquid crystal polyester resin having the lowest flow start temperature is at least 260° C. but not more than 350° C.

[8] A molded article molded from the liquid crystal polyester resin composition according to any one of [1] to [7].

Effects of the Invention

One aspect of the present invention can provide a liquid crystal polyester resin composition that has excellent thin-wall fluidity and is capable of producing a molded article having little warping and superior hardness. Further, a molded article having little warping and superior hardness that is obtained by molding the liquid crystal polyester resin composition is also provided.

EMBODIMENTS FOR CARRYING OUT THE INVENTION

<Liquid Crystal Polyester Resin Composition>

Figure 1:
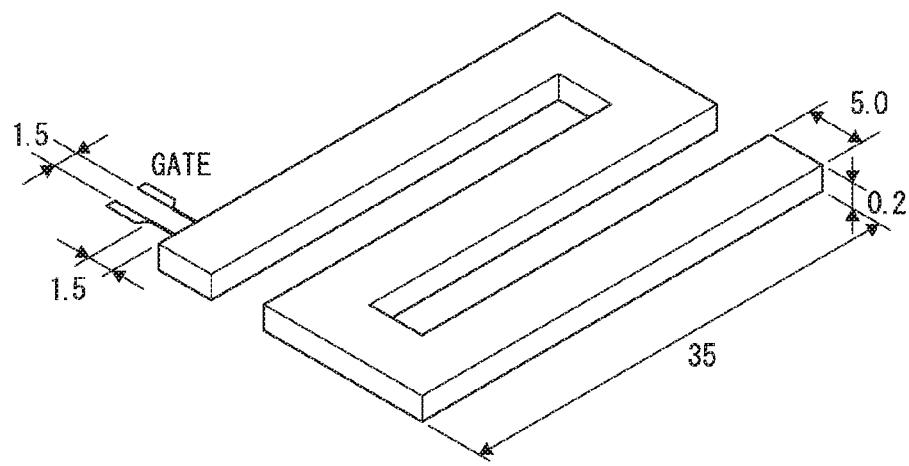
FIG. 1 is a schematic view illustrating a mold used for measuring thin-wall flow length in the examples.

A liquid crystal polyester resin composition of the present embodiment includes a liquid crystal polyester resin, and a filler composed of a fibrous filler and a plate-like filler.

[Liquid Crystal Polyester Resin]

One embodiment mode of the liquid crystal polyester resin used in the present embodiment is described below.

The liquid crystal polyester resin used in the present embodiment is a polyester that exhibits liquid crystallinity in a melted state, and is preferably a polyester that melts at a temperature of 450° C. or lower. The liquid crystal polyester resin may be a liquid crystal polyester amide, a liquid crystal polyester ether, a liquid crystal polyester carbonate, or a liquid crystal polyester imide. The liquid crystal polyester resin is preferably a fully aromatic liquid crystal polyester resin obtained by polymerizing only aromatic compounds as the raw material monomers.

Typical examples of the liquid crystal polyester resin used in the present embodiment include: resins obtained by performing a condensation/polymerization (polycondensation) of an aromatic hydroxycarboxylic acid, an aromatic dicarboxylic acid, and at least one compound selected from the group consisting of aromatic diols, aromatic hydroxyamines and aromatic diamines; resins obtained by polymerizing a plurality of aromatic hydroxycarboxylic acids; resins obtained by polymerizing an aromatic dicarboxylic acid and at least one compound selected from the group consisting of aromatic diols, aromatic hydroxyamines and aromatic diamines; and resins obtained by polymerizing a polyester such as polyethylene terephthalate and an aromatic hydroxycarboxylic acid.

Among these, a resin obtained by condensation/polymerization (polycondensation) of an aromatic hydroxycarboxylic acid, an aromatic dicarboxylic acid, and at least one compound selected from the group consisting of aromatic diols, aromatic hydroxyamines and aromatic diamines is preferable.

Here, each of the aromatic hydroxycarboxylic acids, aromatic dicarboxylic acids, aromatic diols, aromatic hydroxyamines and aromatic diamines may, independently, be partially or completely replaced with a polymerizable ester-forming derivative of the compound.

Examples of polymerizable derivatives of the compounds having a carboxyl group, such as the aromatic hydroxycarboxylic acids and the aromatic dicarboxylic acids, include esters, acid halides and acid anhydrides. Examples of the esters include compounds in which the carboxyl group has been converted to an alkoxycarbonyl group or an aryloxycarbonyl group. Examples of the acid halides include compounds in which the carboxyl group has been converted to a haloformyl group. Examples of the acid anhydrides include compounds in which the carboxyl group has been converted to an acyloxycarbonyl group.

Examples of polymerizable derivatives of the compounds having a hydroxyl group such as the aromatic hydroxycarboxylic acids, aromatic diols and aromatic hydroxyamines include compounds in which a hydroxyl group has been acylated and converted to an acyloxy group (namely, acylated compounds).

Examples of polymerizable derivatives of the compounds having an amino group such as the aromatic hydroxyamines and aromatic diamines include compounds in which an amino group has been acylated and converted to an acylamino group (namely, acylated compounds).

Among the examples of polymerizable derivatives mentioned above, acylated compounds obtained by acylating aromatic hydroxycarboxylic acids and aromatic diols are preferable as raw material monomers for the liquid crystal polyester resin.

The liquid crystal resin used in the present embodiment preferably has a repeating unit represented by formula (1) shown below (hereinafter sometimes referred to as "the repeating unit (1)"). Further, the liquid crystal polyester resin more preferably has the repeating unit (1), a repeating unit represented by formula (2) shown below (hereinafter sometimes referred to as "the repeating unit (2)"), and a repeating unit represented by formula (3) shown below (hereinafter sometimes referred to as "the repeating unit (3)").

  (1)

  (2)

  (3)

[In formulas (1) to (3), $Ar^1$ represents a phenylene group, a naphthylene group, or a biphenylylene group.

Each of $Ar^2$ and $Ar^3$ independently represents a phenylene group, a naphthylene group, a biphenylylene group, or a group represented by formula (4). Each of X and Y independently represents an oxygen atom or an imino group (—NH—).

One or more hydrogen atoms in the group represented by $Ar^1$, $Ar^2$ or $Ar^3$ may each be independently substituted with a halogen atom, an alkyl group of 1 to 10 carbon atoms or an aryl group of 6 to 20 carbon atoms.]

  (4)

[In formula (4), each of $Ar^4$ and $Ar^5$ independently represents a phenylene group or a naphthylene group. Z represents an oxygen atom, sulfur atom, carbonyl group, sulfonyl group or alkylidene group of 1 to 10 carbon atoms.

One or more hydrogen atoms in the group represented by $Ar^4$ or $Ar^5$ may each be independently substituted with a halogen atom, an alkyl group of 1 to 10 carbon atoms or an aryl group of 6 to 20 carbon atoms.]

Examples of the halogen atom that may substitute a hydrogen atom include a fluorine atom, chlorine atom, bromine atom and iodine atom.

Examples of the alkyl group of 1 to 10 carbon atoms that may substitute a hydrogen atom include a methyl group, ethyl group, 1-propyl group, isopropyl group, 1-butyl group, isobutyl group, sec-butyl group, tert-butyl group, 1-hexyl group, 2-ethylhexyl group, 1-octyl group and 1-decyl group.

Examples of the aryl group of 6 to 20 carbon atoms that may substitute a hydrogen atom include monocyclic aromatic groups such as a phenyl group, ortho-tolyl group, meta-tolyl group and para-tolyl group, and condensed aromatic groups such as a 1-naphthyl group and 2-naphthyl group.

In those cases where one or more hydrogen atoms in the group represented by $Ar^1$, $Ar^2$, $Ar^3$, $Ar^4$ or $Ar^5$ are each substituted by a substituent described above, the number of substituents in each group represented by $Ar^1$, $Ar^2$, $Ar^3$, $Ar^4$ or $Ar^5$ is, independently, preferably either one or two. Further, the number of substituents in each group represented by $Ar^1$, $Ar^2$, $Ar^3$, $Ar^4$ or $Ar^5$ is more preferably one.

Examples of the alkylidene group of 1 to 10 carbon atoms include a methylene group, ethylidene group, isopropylidene group, 1-butylidene group and 2-ethylhexylidene group.

The repeating unit (1) is a repeating unit derived from a specific aromatic hydroxycarboxylic acid.

In this description, "derived" means the chemical structure changes as a result of the monomer polymerization, but no other structural changes occur.

Examples of the aromatic hydroxycarboxylic acid include 4-hydroxybenzoic acid, meta-hydroxybenzoic acid, 2-hydroxy-6-naphthoic acid, 2-hydroxy-3-naphthoic acid, 1-hydroxy-5-naphthoic acid, 4-hydroxy-4'-carboxydiphenyl ether, and aromatic hydroxycarboxylic acids in which a portion of the hydrogen atoms on the aromatic ring(s) of the above aromatic hydroxycarboxylic acids have each been substituted with a substituent selected from the group consisting of the alkyl groups, aryl groups and halogen atoms described above.

Either one aromatic hydroxycarboxylic acid may be used alone, or a combination of two or more aromatic hydroxycarboxylic acids may be used, in the production of the liquid crystal polyester resin.

The repeating unit (1) is preferably a repeating unit in which $Ar^1$ is a 1,4-phenylene group (a repeating unit derived from 4-hydroxybenzoic acid) or a repeating unit in which Ar$^1$ is a 2,6-naphthylene group (a repeating unit derived from 6-hydroxy-2-naphthoic acid).

The repeating unit (2) is a repeating unit derived from a specific aromatic dicarboxylic acid.

Examples of the aromatic dicarboxylic acid include terephthalic acid, isophthalic acid, biphenyl-4,4'-dicarboxylic acid, 2,6-naphthalenedicarboxylic acid, diphenyl ether-4,4'-dicarboxylic acid, diphenyl thioether-4,4'-dicarboxylic acid, and aromatic dicarboxylic acids in which a portion of the hydrogen atoms on the aromatic ring(s) of the above aromatic dicarboxylic acids have each been substituted with a substituent selected from the group consisting of alkyl groups, aryl groups and halogen atoms.

Either one aromatic dicarboxylic acid may be used alone, or a combination of two or more aromatic dicarboxylic acids may be used, in the production of the liquid crystal polyester resin.

The repeating unit (2) is preferably a repeating unit in which Ar$^2$ is a 1,4-phenylene group (for example, a repeating unit derived from terephthalic acid), a repeating unit in which Ar$^2$ is a 1,3-phenylene group (for example, a repeating unit derived from isophthalic acid), a repeating unit in which Ar$^2$ is a 2,6-naphthylene group (for example, a repeating unit derived from 2,6-naphthalenedicarboxylic acid), or a repeating unit in which Ar$^2$ is a diphenyl ether-4,4'-diyl group (for example, a repeating unit derived from diphenyl ether-4,4'-dicarboxylic acid).

The repeating unit (3) is a repeating unit derived from a specific aromatic diol, aromatic hydroxylamine or aromatic diamine.

Examples of the aromatic diol, aromatic hydroxylamine or aromatic diamine include 4,4'-dihydroxybiphenyl, hydroquinone, resorcinol, 4,4'-dihydroxydiphenyl ketone, 4,4'-dihydroxydiphenyl ether, bis(4-hydroxyphenyl)methane, 1,2-bis(4-hydroxyphenyl)ethane, 4,4'-dihydroxydiphenyl sulfone, 4,4'-dihydroxydiphenyl thioether, 2,6-dihydroxynaphthalene, 1,5-dihydroxynaphthalene, 4-aminophenol, 1,4-phenylenediamine, 4-amino-4'-hydroxybiphenyl, and 4,4'-diaminobiphenyl.

Either one aromatic diol, aromatic hydroxylamine or aromatic diamine may be used alone, or a combination of two or more such compounds may be used, in the production of the liquid crystal polyester resin.

The repeating unit (3) is preferably a repeating unit in which Ar$^3$ is a 1,4-phenylene group (for example, a repeating unit derived from hydroquinone, 4-aminophenol or 1,4-phenylenediamine), or a repeating unit in which Ar$^3$ is a 4,4'-biphenylylene group (for example, a repeating unit derived from 4,4'-dihydroxybiphenyl, 4-amino-4'-hydroxybiphenyl or 4,4'-diaminobiphenyl).

In those cases where the molded article obtained from the liquid crystal polyester resin composition of the present embodiment requires particularly favorable heat resistance and thermal stability, the number of substituents in the repeating units (1) to (3) is preferably low. Further, in those cases where the molded article obtained from the liquid crystal polyester resin composition of the present embodiment requires particularly favorable heat resistance and thermal stability, the repeating units preferably have no substituents that are susceptible to heat (for example, alkyl groups).

In the present embodiment, heat resistance of a molded article describes a property in which the resin that forms the molded article is resistant to softening upon excessive heating. In the present embodiment, the heat resistance of a molded article can be found by measuring the deflection temperature under load of a test piece prepared by molding the resin composition of the present embodiment. In the present embodiment, the deflection temperature under load is measured in accordance with ASTM D648 under a load of 1.82 MPa. Specifically, the resin composition of the present embodiment is molded to form a test piece having dimensions of 127 mm×12.7 mm×6.4 mmt. Then, under a load of 1.82 MPa, the temperature of the test piece is raised using a heating medium with the rate of temperature increase of the heating medium adjusted to 4° C./minute, and the temperature at which a deflection of 0.25 mm occurs is measured. This measurement is performed twice, and the average value is deemed the deflection temperature under load of the present embodiment. It can be stated that the higher the deflection temperature under load of a test piece measured in this manner, the greater the heat resistance of the molded article of the present embodiment.

In the present embodiment, thermal stability of a molded article describes a property in which decomposition or degradation of the resin is unlikely to occur when the molded article is held at the temperature at which the resin is molded (the melt temperature).

Next, in relation to the particularly preferable liquid crystal polyester resin when it is applied to the present embodiment, combinations of structural units for the liquid crystal polyester resin will be described in detail based on the examples of the structural units described above.

Specific examples of preferable liquid crystal polyester resins for use in the present embodiment include copolymers composed of structural units derived from the monomers specifically listed below.

(a) 4-hydroxybenzoic acid/2-hydroxy-6-naphthoic acid copolymers (b) 4-hydroxybenzoic acid/terephthalic acid/4,4'-dihydroxybiphenyl copolymers (c) 4-hydroxybenzoic acid/terephthalic acid/isophthalic acid/4,4'-dihydroxybiphenyl copolymers (d) 4-hydroxybenzoic acid/terephthalic acid/isophthalic acid/4,4'-dihydroxybiphenyl/hydroquinone copolymers (e) 4-hydroxybenzoic acid/terephthalic acid/hydroquinone copolymers (f) 2-hydroxy-6-naphthoic acid/terephthalic acid/hydroquinone copolymers (g) 4-hydroxybenzoic acid/2-hydroxy-6-naphthoic acid/terephthalic acid/4,4'-dihydroxybiphenyl copolymers (h) 2-hydroxy-6-naphthoic acid/terephthalic acid/4,4'-dihydroxybiphenyl copolymers (i) 4-hydroxybenzoic acid/2-hydroxy-6-naphthoic acid/terephthalic acid/hydroquinone copolymers (j) 4-hydroxybenzoic acid/2-hydroxy-6-naphthoic acid/terephthalic acid/hydroquinone/4,4'-dihydroxybiphenyl copolymers (k) 4-hydroxybenzoic acid/2,6-naphthalenedicarboxylic acid/4,4'-dihydroxybiphenyl copolymers (l) 4-hydroxybenzoic acid/terephthalic acid/2,6-naphthalenedicarboxylic acid/hydroquinone copolymers (m) 4-hydroxybenzoic acid/2,6-naphthalenedicarboxylic acid/hydroquinone copolymers (n) 4-hydroxybenzoic acid/2-hydroxy-6-naphthoic acid/2,6-naphthalenedicarboxylic acid/hydroquinone copolymers (o) 4-hydroxybenzoic acid/terephthalic acid/2,6-naphthalenedicarboxylic acid/hydroquinone/4,4'-dihydroxybiphenyl copolymers (p) 4-hydroxybenzoic acid/terephthalic acid/4-aminophenol copolymers (q) 2-hydroxy-6-naphthoic acid/terephthalic acid/4-aminophenol copolymers (r) 4-hydroxybenzoic acid/2-hydroxy-6-naphthoic acid/terephthalic acid/4-aminophenol copolymers (s) 4-hydroxybenzoic acid/terephthalic acid/4,4'-dihydroxybiphenyl/4-aminophenol copolymers (t) 4-hydroxybenzoic acid/terephthalic acid/ethylene glycol copolymers (u) 4-hydroxybenzoic acid/terephthalic acid/4,4'-dihydroxybiphenyl/ethylene glycol copolymers (v) 4-hydroxybenzoic acid/2-hydroxy-6-naphthoic acid/terephthalic acid/ethylene glycol copolymers (w) 4-hydroxybenzoic acid/2-hydroxy-6-naphthoic acid/terephthalic acid/4,4'-dihydroxybiphenyl/ethylene glycol copolymers (x) 4-hydroxybenzoic acid/terephthalic acid/2,6-naphthalenedicarboxylic acid/4,4'-dihydroxybiphenyl copolymers Among the above examples, (b) and (c) are preferable, and (c) is more preferable.

The amount of the repeating unit (1) in the liquid crystal polyester resin, relative to the total number of moles of all the repeating units that constitute the liquid crystal polyester resin, is preferably at least 30 mol %, more preferably at least 30 mol % but not more than 80 mol %, even more preferably at least 30 mol % but not more than 70 mol %, and particularly preferably at least 35 mol % but not more than 65 mol %. The total number of moles of all the repeating units that constitute the liquid crystal polyester resin is the value obtained by determining the mass-equivalent amount (moles) of each repeating unit that constitutes the liquid crystal polyester resin by dividing the mass of the repeating unit by the formula weight of the repeating unit, and then totaling those mass-equivalent amounts.

By ensuring that the amount of the repeating unit (1) in the liquid crystal polyester resin relative to the total number of moles of all the repeating units that constitute the liquid crystal polyester resin is at least 30 mol %, the heat resistance and hardness of a molded article obtained by molding the liquid crystal polyester resin composition of the present embodiment can be more easily improved. Further, by ensuring that the amount of the repeating unit (1) relative to the total number of moles of all the repeating units that constitute the liquid crystal polyester resin is not more than 80 mol %, the melt viscosity can be lowered. As a result, the temperature required for molding of the liquid crystal polyester resin is more easily lowered.

The amount of the repeating unit (2) in the liquid crystal polyester resin, relative to the total number of moles of all the repeating units that constitute the liquid crystal polyester resin, is preferably not more than 35 mol %, more preferably at least 10 mol % but not more than 35 mol %, even more preferably at least 15 mol % but not more than 35 mol %, and particularly preferably at least 17.5 mol % but not more than 32.5 mol %.

The amount of the repeating unit (3) in the liquid crystal polyester resin, relative to the total number of moles of all the repeating units that constitute the liquid crystal polyester resin, is preferably not more than 35 mol %, more preferably at least 10 mol % but not more than 35 mol %, even more preferably at least 15 mol % but not more than 35 mol %, and particularly preferably at least 17.5 mol % but not more than 32.5 mol %.

In the liquid crystal polyester resin, the ratio between the amount of the repeating unit (2) and the amount of the repeating unit (3), when represented by [amount of repeating unit (2)]/[amount of repeating unit (3)] (mol/mol), is preferably within a range from 0.9/1 to 1/0.9, more preferably from 0.95/1 to 1/0.95, and even more preferably from 0.98/1 to 1/0.98.

The liquid crystal polyester resin described above may independently have only one type, or may have two or more types, of each of the repeating units (1) to (3). Further, in the liquid crystal polyester resin, the total amount of the repeating units (1) to (3) does not exceed 100 mol % of all the repeating units that constitute the liquid crystal polyester resin. Furthermore, the liquid crystal polyester resin may have one, or two or more, other repeating units besides the repeating units (1) to (3), but the amount of those other repeating units, relative to the total number of moles of all the repeating units that constitute the liquid crystal polyester resin, is not more than 10 mol %, and moreover preferably 5 mol % or less.

[Method for Producing Liquid Crystal Polyester Resin]

Next is a description of one example of a method for producing the liquid crystal polyester resin used in the present embodiment.

The liquid crystal polyester resin of the present embodiment is preferably produced by an acylation step and polymerization step described below.

The acylation step is a step of obtaining an acylated product by acylating the phenolic hydroxyl groups of the raw material monomers with an aliphatic acid anhydride (for example, acetic anhydride or the like).

In the polymerization step, the acyl groups of the acylated product obtained in the acylation step and the carboxyl groups of the acylated products of the aromatic dicarboxylic acid and aromatic hydroxycarboxylic acid are polymerized so as to cause a transesterification, thereby obtaining a liquid crystal polyester resin.

The above acylation step and polymerization step may be conducted in the presence of a heterocyclic organic base compound such as that represented by formula (5) below.

[Chemical formula 1]

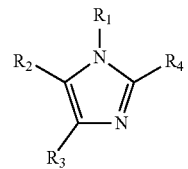

(5)

In the above formula (5), each of $R_1$ to $R_4$ independently represents a hydrogen atom, alkyl group of 1 to 4 carbon atoms, hydroxymethyl group, cyano group, cyanoalkyl group having an alkyl group of 1 to 4 carbon atoms, cyanoalkoxy group having an alkoxy group of 1 to 4 carbon atoms, carboxyl group, amino group, aminoalkyl group of 1 to 4 carbon atoms, aminoalkoxy group of 1 to 4 carbon atoms, phenyl group, benzyl group, phenylpropyl group, or formyl group.

Among the heterocyclic organic base compounds represented by the above formula (5), preferable compounds include imidazole derivatives in which $R_1$ in the formula (5) represents an alkyl group of 1 to 4 carbon atoms and $R_2$ to $R_4$ are hydrogen atoms. Such compounds are able to further improve the reactivity of the acylation reaction in the acylation step and the transesterification reaction in the polymerization step. Further, the color tone of the molded article obtained using the liquid crystal polyester resin composition of the present embodiment can be further improved.

Among the various heterocyclic organic base compounds, because of ease of availability, the use of one or both of 1-methylimidazole and 1-ethylimidazole is particularly preferable.

Further, the amount used of the heterocyclic organic base compound, when the total amount of the raw material monomers for the liquid crystal polyester resin (namely, the aromatic dicarboxylic acid, aromatic diol and aromatic hydroxycarboxylic acid) is deemed to be 100 parts by mass, is preferably within a range from 0.005 to 1 part by mass. Furthermore, from the viewpoints of the color tone and the productivity of the molded article, the amount used of the heterocyclic organic base compound is more preferably from 0.05 to 0.5 parts by mass per 100 parts by mass of the raw material monomers.

The heterocyclic organic base compound may exist at one period during the acylation reaction and transesterification reaction, and the timing of the addition may be immediately prior to the start of the acylation reaction, partway through the acylation reaction, or between the acylation reaction and the transesterification reaction.

The liquid crystal polyester resin obtained in this manner has an extremely high melt fluidity and excellent thermal stability.

The amount used of the aliphatic acid anhydride (such as acetic anhydride or the like) should be determined with due consideration of the amounts used of the aromatic diol and the aromatic hydroxycarboxylic acid among the raw material monomers. Specifically, the amount of the aliphatic acid anhydride relative to the total amount of phenolic hydroxyl groups contained in these raw material monomers is preferably at least 1.0 equivalent but not more than 1.2 equivalents, more preferably at least 1.0 equivalent but not more than 1.15 equivalents, even more preferably at least 1.03 equivalents but not more than 1.12 equivalents, and particularly preferably at least 1.05 equivalents but not more than 1.1 equivalents.

Provided the amount used of the aliphatic acid anhydride is a least 1.0 equivalent relative to the total amount of phenolic hydroxyl groups contained in the raw material monomers, the acylation reaction proceeds readily and unreacted raw material monomer is less likely to remain in the subsequent polymerization step, resulting in the polymerization proceeding more efficiently. Further, when the acylation reaction proceeds favorably in this manner, the possibility of unacylated raw material monomers sublimating and blocking the fractionator used during polymerization is reduced. On the other hand, provided the amount used of the aliphatic acid anhydride is not more than 1.2 equivalents, the obtained liquid crystal polyester resin is less likely to suffer coloration.

The acylation reaction in the above acylation step is preferably performed within a temperature range of 130° C. to 180° C. for a period of 30 minutes to 20 hours, and is more preferably performed at 140° C. to 160° C. for 1 to 5 hours.

The aromatic dicarboxylic acid used in the above polymerization step may exist in the reaction system during the acylation step. In other words, in the acylation step, the aromatic diol, the aromatic hydroxycarboxylic acid and the aromatic dicarboxylic acid may all be included in the same reaction system.

This is because none of the carboxyl groups or optionally substituted substituents in the aromatic dicarboxylic acid are affected in any way by the aliphatic acid anhydride.

Accordingly, a method may be used in which the aromatic diol, the aromatic hydroxycarboxylic acid and the aromatic dicarboxylic acid are all added to a reactor and the acylation step and the polymerization step are then performed sequentially, or a method may be used in which the aromatic diol and the aromatic hydroxycarboxylic acid are added to the reactor and the acylation reaction is performed, and the aromatic dicarboxylic acid is then added to the reactor and the polymerization reaction is performed. From the viewpoint of simplifying the production process, the former method is preferable.

The transesterification reaction in the above polymerization step is preferably performed while the temperature is raised from 130° C. to 400° C. at a rate of temperature increase of 0.1 to 50° C./minute, and is more preferably performed while the temperature is raised from 150° C. to 350° C. at a rate of temperature increase of 0.3 to 5° C./minute.

Furthermore, when performing the transesterification reaction of the polymerization step, in order to shift the equilibrium, any by-product fatty acids (for example, acetic acid and the like) and any unreacted aliphatic acid anhydride (for example, acetic anhydride or the like) are preferably evaporated and removed from the system by distillation. At this time, by refluxing a portion of the distilled fatty acid and returning it to the reactor, any raw material monomers or the like that may have evaporated or sublimated together with the fatty acid can be condensed or reverse sublimated and returned to the reactor.

In the acylation reaction of the acylation step and the transesterification reaction of the polymerization step, a batch apparatus or a continuous apparatus may be used as the reactor. Regardless of which type of apparatus is used, a liquid crystal polyester resin that can be used in the present embodiment is obtained.

After the polymerization step described above, a step for increasing the molecular weight of the liquid crystal polyester resin obtained in the polymerization step may be performed. For example, by cooling the liquid crystal polyester resin obtained in the polymerization step, subsequently crushing the resin to produce a powdered liquid crystal polyester resin, and then heating this powder, the molecular weight of the liquid crystal polyester resin can be increased.

Further, increasing the molecular weight of the liquid crystal polyester resin may also be performed by producing a pelletized liquid crystal polyester resin by granulating the powdered liquid crystal polyester resin obtained by cooling and crushing, and then subsequently heating this pelletized liquid crystal polyester resin. Increasing the molecular weight using these methods is known as solid phase polymerization in the technical field.

Solid phase polymerization is a particularly effective method for increasing the molecular weight of the liquid crystal polyester resin.

By increasing the molecular weight of the liquid crystal polyester resin, a liquid crystal polyester resin having a preferable flow start temperature described below can be obtained with ease.

The reaction conditions for the above solid phase polymerization typically employ a method in which the solid-state liquid crystal polyester resin is subjected to a heat treatment for 1 to 20 hours either under an inert gas atmosphere or under reduced pressure. These polymerization conditions for the solid phase polymerization may be optimized appropriately once the flow start temperature of the liquid crystal polyester resin obtained in the above melt polymerization has been determined.

Examples of the devices that may be used in the above heat treatment include known dryers, reactors, inert ovens, and electric ovens and the like.

The flow start temperature of the liquid crystal polyester resin is preferably at least 270° C., more preferably from 270 to 400° C., and even more preferably from 280 to 380° C. By using a liquid crystal polyester resin for which the flow start temperature falls within this type of range, improvements in the heat resistance and hardness of the molded article obtained using the liquid crystal polyester resin composition of the present embodiment can be expected. Further, during the melt molding used for obtaining a molded article from the liquid crystal polyester resin composition, the thermal stability of the liquid crystal polyester resin improves, and thermal degradation can be avoided.

The flow start temperature is also called the flow temperature or the fluidizing temperature, and is the temperature that yields a viscosity of 4,800 Pa·s (48,000 poise) when the liquid crystal polyester resin is melted by heating at a rate of temperature increase of 4° C./minute under a load of 9.8 MPa using a capillary rheometer, and extruded from a nozzle having an inner diameter of 1 mm and a length of 10 mm, and is a temperature that acts as an indicator of the molecular weight of the liquid crystal polyester (see Naoyuki Koide (ed.), "Liquid Crystal Polymers—Synthesis, Molding, Applications", pp. 95 to 105, published by CMC Publishing Co., Ltd., Jun. 5, 1987).

A liquid crystal polyester resin having a flow start temperature that falls within the above preferable range can be easily obtained by appropriately optimizing the structural units that constitute the liquid crystal polyester resin. In other words, increasing the linearity of the molecular chain of the liquid crystal polyester resin tends to increase the flow start temperature.

For example, among the structural units derived from the above aromatic dicarboxylic acids, terephthalic acid increases the linearity of the liquid crystal polyester resin molecular chain, whereas isophthalic acid increases the flexibility of the liquid crystal polyester resin molecular chain (and reduces the linearity). Accordingly, by controlling the copolymerization ratio between terephthalic acid and isophthalic acid, a liquid crystal polyester resin having the desired flow start temperature can be obtained.

In the present embodiment, a liquid crystal polyester resin mixture (hereinafter referred to as a "resin mixture") prepared by mixing a plurality of liquid crystal polyester resins may also be used. In such cases, at least one liquid crystal polyester resin is preferably a resin obtained by polymerizing raw material monomers including an aromatic hydroxycarboxylic acid in the presence of an imidazole derivative. A liquid crystal polyester resin obtained in this manner has extremely high melt fluidity, and exhibits excellent thermal stability (stability over time).

Furthermore, in the liquid crystal polyester resin used in the present embodiment, it is preferable that the copolymerization ratio between the structural units of terephthalic acid and isophthalic acid is optimized. As described above, this enables the linearity of the molecular chain of the liquid crystal polyester resin to be controlled. As a result, a plurality of liquid crystal polyester resins having mutually different flow start temperatures can be produced.

The resin mixture may be assumed to be a mixture of two liquid crystal polyester resins having mutually different flow start temperatures. In this resin mixture, the resin having the higher flow start temperature is deemed the first liquid crystal polyester resin and the resin having the lower flow start temperature is deemed the second liquid crystal polyester resin.

When the molar ratio (isophthalic acid/terephthalic acid) of the first liquid crystal polyester resin is termed a, and the molar ratio (isophthalic acid/terephthalic acid) of the second liquid crystal polyester resin is termed (3, the ratio (a/(3) between the molar ratio of the second liquid crystal polyester resin and the molar ratio of the first liquid crystal polyester resin is preferably within a range from 0.1 to 0.6, and more preferably within a range from 0.3 to 0.6.

In the present embodiment, using a resin mixture including a first liquid crystal polyester resin and a second liquid crystal polyester resin is preferable. This enables the melt fluidity of the liquid crystal polyester resin composition of the present embodiment to be further improved, and enables satisfactory suppression of warping of molded articles obtained from the liquid crystal polyester resin composition.

The lower limit for the flow start temperature of the first liquid crystal polyester resin is preferably 300° C., more preferably 310° C., and even more preferably 315° C. The upper limit for the flow start temperature of the first liquid crystal polyester resin is preferably 400° C., more preferably 360° C., and even more preferably 345° C. The above upper limit and lower limit values may be combined as desired. For example, the flow start temperature of the first liquid crystal polyester resin is preferably at least 300° C. but not more than 400° C., more preferably at least 310° C. but not more than 360° C., and even more preferably at least 315° C. but not more than 345° C.

When the flow start temperature of the first liquid crystal polyester resin falls within the above range, the balance between the melt fluidity of the mixed resin and the heat resistance of the obtained molded article tends to be more favorable.

On the other hand, the lower limit for the flow start temperature of the second liquid crystal polyester resin is preferably 260° C., more preferably 270° C., and even more preferably 285° C. Further, the upper limit for the flow start temperature of the second liquid crystal polyester resin is preferably 350° C., more preferably 320° C., and even more preferably 315° C. The above upper limit and lower limit values may be combined as desired. For example, the flow start temperature of the second liquid crystal polyester resin is preferably at least 260° C. but not more than 350° C., more preferably at least 270° C. but not more than 320° C., and even more preferably at least 285° C. but not more than 315° C.

When the flow start temperature of the second liquid crystal polyester resin falls within the above range, the thin-wall fluidity is more easily improved, and the deflection temperature under load of the molded article obtained from the resin mixture tends to increase satisfactorily.

Furthermore, in the resin mixture, the amount of the second liquid crystal polyester resin per 100 parts by mass of the first liquid crystal polyester resin is preferably within a range from 10 to 150 parts by mass, more preferably from 30 to 120 parts by mass, and even more preferably from 50 to 100 parts by mass.

The amount of the second liquid crystal polyester resin relative to the amount of the first liquid crystal polyester resin may be set as appropriate with due consideration of the balance between the deflection temperature under load and the thin-wall fluidity of the resin mixture.

The resin mixture may also contain a liquid crystal polyester resin other than the first liquid crystal polyester resin and the second liquid crystal polyester resin. In such cases, the resin having the highest flow start temperature may be deemed the first liquid crystal polyester resin, and the resin having the lowest flow start temperature may be deemed the second liquid crystal polyester resin. A resin mixture composed of substantially only the first liquid crystal polyester resin and the second liquid crystal polyester resin is preferable.

[Filler]

The liquid crystal polyester resin composition of the present embodiment includes at least 15 parts by mass but not more than 55 parts by mass of a filler composed of a fibrous filler and a plate-like filler per 100 parts by mass of the liquid crystal polyester resin.

Provided the amount of the filler is at least 15 parts by mass, the strength and hardness of the obtained molded article can be satisfactorily increased. In contrast, when the amount of the filler is less than 15 parts by mass, the heat resistance and mechanical properties of the liquid crystal polyester resin composition tend to be unsatisfactory, and warping of the obtained molded article becomes more likely.

Further, provided the amount of the filler is not more than 55 parts by mass, the thin-wall fluidity during molding can be satisfactorily improved. In contrast, when the amount of the filler exceeds 55 parts by mass, the melt fluidity of the liquid crystal polyester resin composition worsens, and blistering is more likely to occur.

The lower limit for the amount of the filler used in the present embodiment is preferably 24 parts by mass, and more preferably 32 parts by mass, per 100 parts by mass of the liquid crystal polyester resin. Further, the upper limit for the amount of the filler is preferably 45 parts by mass, and more preferably 42 parts by mass. The above upper limit and lower limit values may be combined as desired. For example, the amount of the filler used in the present embodiment, per 100 parts by mass of the liquid crystal polyester resin, is preferably at least 24 parts by mass but not more than 45 parts by mass, and more preferably at least 32 parts by mass but not more than 42 parts by mass.

Provided the total amount of the plate-like filler and the fibrous filler falls within the above range, the heat resistance and weld strength of the liquid crystal polyester resin composition are more superior, and warping of the obtained molded article is unlikely to occur.

In the liquid crystal polyester resin composition of the present embodiment, the amount of the fibrous filler is preferably from 5 to 30 parts by mass, and more preferably from 10 to 30 parts by mass, per 100 parts by mass of the liquid crystal polyester resin. Provided the amount of the fibrous filler falls within this range, the heat resistance and mechanical properties of the liquid crystal polyester resin composition are more superior.

In the liquid crystal polyester resin composition of the present embodiment, the amount of the plate-like filler is preferably from 5 to 30 parts by mass, and more preferably from 10 to 30 parts by mass, per 100 parts by mass of the liquid crystal polyester resin.

In the liquid crystal polyester resin composition of the present embodiment, the ratio (W1/W2) between the fibrous filler content (W1) and the plate-like filler content (W2) is preferably within a range from at least 0.5 to not more than 2.0, more preferably within a range from at least 0.6 to not more than 1.8, and particularly preferably within a range from at least 0.8 to not more than 1.2.

(Fibrous Filler)

The number average fiber diameter of the fibrous filler contained in the liquid crystal polyester resin composition of the present embodiment is at least 450 μm but not more than 700 μm. Provided the number average fiber length of the fibrous filler is at least 450 μm, the mechanical strength and hardness of the obtained molded article can be satisfactorily increased.

In the present embodiment, the hardness of the molded article is also called the "surface hardness" or the "Rockwell hardness". The hardness of the molded article is measured by molding a test piece with a thickness of 6.4 mm, and then using a Rockwell hardness meter (FR-1E, manufactured by Toyo Seiki Seisaku-sho, Ltd.) to measure the hardness under a test load of 588.4 N using the R scale (steel sphere of diameter 12.7 mm) in accordance with ASTM D785. This measurement is performed 3 times, and the average of the three measurements is employed as the hardness of the molded article of the present embodiment.

Here, it is important that the thickness of the test piece is at least 6 mm, and that the test piece has no cavity (sink mark). If the thickness is less than 6 mm, then when the indenter is pressed into the test piece, there is a possibility that the lower surface may affect the result. Further, if a cavity exists, then a gap occurs between the test piece and the molded article pedestal, meaning an accurate measurement may sometimes be impossible when the indenter is pressed into the test piece.

The reasons that the hardness of the obtained molded article increase are thought to include the following. Typically, a molded article that uses a liquid crystal polyester resin composition as the forming material has a "skin layer" that exists at the surface of the molded article and a "core layer" that exists in the interior of the molded article. When a conventional liquid crystal polyester resin composition containing a fibrous filler is used, the fibrous filler exists largely within the core layer of the molded article.

In contrast, in the liquid crystal polyester resin composition of the present embodiment, the number average fiber length of the fibrous filler, at a length of at least 450 μm, is considerably long. As a result, it is surmised that when the liquid crystal polyester resin composition of the present embodiment is used, the fibrous filler exists from the core layer through to the skin layer of the molded article.

Accordingly, it is surmised that compared with a molded article obtained using a conventional liquid crystal polyester resin composition, a molded article obtained using the liquid crystal polyester resin composition of the present embodiment has a larger amount of the fibrous filler near the surface. The fibrous filler is typically formed from a material having a higher Mohs hardness than the liquid crystal polyester resin. Accordingly, in the liquid crystal polyester resin composition of the present embodiment, it is thought that this results in a higher hardness for the molded article.

Here, Mohs hardness is an empirical measure for determining the hardness of a mineral by comparison with ten standard minerals. The standard minerals, listed in order from softest (Mohs hardness 1) through to hardest (Mohs hardness 10) are talc, gypsum, calcite, fluorite, apatite, orthoclase feldspar, quartz, topaz, corundum and diamond, and the hardness is measured by rubbing the test substance for which the hardness requires measurement against each standard mineral, and evaluating whether or not the test substance is scratched. For example, a substance which is not scratched by fluorite but is scratched by apatite has a Mohs hardness of 4.5 (meaning a value between 4 and 5).

Moreover, provided the number average fiber length of the fibrous filler is sufficiently long, at a length of at least 450 μm, the reinforcing effect on the obtained molded article is excellent. Accordingly, it is thought that warping of the molded article decreases. Further, provided the number average fiber length of the fibrous filler is sufficiently long, at a length of at least 450 μm, the dimensional stability of the obtained molded article is excellent.

The lower limit for the number average fiber length of the fibrous filler is preferably 470 µm, more preferably 500 µm, and even more preferably 520 µm.

On the other hand, provided the number average fiber length of the fibrous filler of the present embodiment is not more than 700 µm, the liquid crystal polyester resin composition can be obtained in a stable manner. Further, provided the number average fiber length of the fibrous filler of the present embodiment is not more than 700 µm, inhibition of the fluidity of the liquid crystal polyester resin composition by the fibrous filler is unlikely. As a result, fluidity can be uniformly maintained in the liquid crystal polyester resin composition of the present embodiment. Accordingly, in the present embodiment, the liquid crystal polyester resin composition can be used to easily fill thin-wall portions or narrow-pitch lattice portions of the molded article.

The upper limit for the number average fiber length of the fibrous filler is preferably 650 µm, and more preferably 600 µm.

The lower limit and upper limit values for the number average fiber length of the fibrous filler may be combined as desired. For example, the number average fiber length of the fibrous filler is preferably at least 470 µm but not more than 650 µm, more preferably at least 500 µm but not more than 600 µm, and even more preferably at least 520 µm but not more than 600 µm.

Furthermore, the number average fiber diameter of the fibrous filler of the present embodiment is preferably at least 5 µm but not more than 20 µm. Provided the number average fiber diameter of the fibrous filler is at least 5 µm, the fibrous filler does not suffer unnecessary breakage during production of the liquid crystal polyester resin composition. As a result, the number average fiber length of the fibrous filler contained in the liquid crystal polyester resin composition can be controlled within the range described above. Further, provided the average fiber diameter of the fibrous filler is not more than 20 µm, any deterioration in the hardness of the molded article that accompanies a reduction in the aspect ratio of the filler (the ratio of fiber length/fiber diameter) can be avoided.

The number average fiber diameter of the fibrous filler of the present embodiment is more preferably at least 6 µm. Further, the fiber diameter is preferably not more than 17 µm, and more preferably 15 µm or less.

The number average fiber length of the fibrous filler contained in the liquid crystal polyester resin composition can be adjusted by altering the conditions of the melt kneading performed during production of the liquid crystal polyester resin composition and the composition of the extruder used for the melt kneading.

The number average fiber length of the fibrous filler contained in the liquid crystal polyester resin composition of the present embodiment is measured by the following method.

First, 5 g of pellets formed from the liquid crystal polyester resin composition of the present embodiment are heated in a muffle furnace (for example, FP410, manufactured by Yamato Scientific Co., Ltd.) under an air atmosphere at 600° C. for 4 hours to remove the resin. The thus obtained ashed residue containing the fibrous filler is then dispersed in an ethylene glycol solution and irradiated with ultrasonic waves for 3 minutes.

Next, several drops of the dispersion are dripped onto a slide glass, and the fibrous filler is disentangled to ensure the fibers of the fibrous filler do not overlap on the slide glass. A cover glass is then placed on top of the disentangled fibrous filler, and a video microscope (for example, VHX-1000 manufactured by Keyence Corporation) is adjusted at a magnification of 100× to ensure that the contours of the fibrous filler are in focus. The lengths of 500 fibers of the fibrous filler are measured, and the average fiber length is calculated.

Further, the number average fiber diameter of the fibrous filler contained in the liquid crystal polyester resin composition of the present embodiment is measured by the following method.

First, 5 g of pellets formed from the liquid crystal polyester resin composition of the present embodiment are heated in a muffle furnace (for example, FP410, manufactured by Yamato Scientific Co., Ltd.) under an air atmosphere at 600° C. for 4 hours to remove the resin. The thus obtained ashed residue containing the fibrous filler is then dispersed in an ethylene glycol solution and irradiated with ultrasonic waves for 3 minutes.

Next, several drops of the dispersion are dripped onto a slide glass, and the fibrous filler is disentangled to ensure the fibers of the fibrous filler do not overlap on the slide glass. A cover glass is then placed on top of the disentangled fibrous filler, and a video microscope (for example, VHX-1000 manufactured by Keyence Corporation) is adjusted at a magnification of 500× to ensure that the contours of the fibrous filler are in focus. The diameters of 50 fibers of the fibrous filler are measured, and the average fiber diameter is calculated.

The fibrous filler used in the present embodiment may be an inorganic filler or an organic filler. Further, the Mohs hardness is preferably 4 or higher.

Examples of fibrous inorganic fillers include glass fiber; carbon fiber such as PAN-based carbon fiber and pitch-based carbon fiber; ceramic fiber such as silica fiber, alumina fiber and silica-alumina fiber; and metal fiber such as stainless steel fiber. Further examples include whiskers such as potassium titanate whiskers, barium titanate whiskers, wollastonite whiskers, aluminum borate whiskers, silicon nitride whiskers and silicon carbide whiskers.

Examples of fibrous organic fillers include polyester fiber, aramid fiber and cellulose fiber.

Among the fibers listed above, in terms of offering excellent strength and ease of availability, glass fiber is preferable.

(Glass Fiber)

In the present embodiment, by including glass fiber in the liquid crystal polyester resin composition, the strength, heat resistance and surface hardness of the molded article can be improved.

Examples of the glass fiber include glass fiber produced by any of various methods, including long fiber-type chopped glass fiber and short fiber-type milled glass fiber. A combination of two or more types of fiber may also be used.

Examples of the various types of glass fiber include E-glass, A-glass, C-glass, D-glass, AR-glass, R-glass, S-glass, and mixtures of these fibers. Among these, E-glass is preferable in terms of offering excellent strength and ease of availability.

For the glass fiber, a weakly alkaline glass fiber is superior in terms of providing excellent mechanical strength (tensile strength and Izod impact strength), and can be used favorably. A glass fiber having a silicon oxide content, relative to the total mass of the glass fiber, of 50 to 80% by mass is preferable, and a glass fiber having a silicon oxide content, relative to the total mass of the glass fiber, of 65 to 77% by mass is more preferable.

If required, the glass fiber may be a fiber that has been treated with a coupling agent such as a silane-based coupling agent or a titanium-based coupling agent.

The glass fiber may be coated with a thermoplastic resin such as a urethane resin, acrylic resin or ethylene/vinyl acetate copolymer, or a thermosetting resin such as an epoxy resin, or may be treated with a sizing agent.

The number average fiber length of the glass fiber that represents the raw material supplied to melt kneading is preferably from 500 μm to 6,000 μm. When the number average fiber length of the glass fiber is at least 500 μm, the reinforcing effect on the obtained molded article is suitably high. Further, when the number average fiber length of the glass fiber is not more than 6,000 μm, the number average fiber length of the glass fiber contained in the liquid crystal polyester resin composition following melt kneading can be easily adjusted to a value of not more than 700 μm.

The lower limit for the number average fiber length of the glass fiber that represents the raw material supplied to melt kneading is more preferably at least 1,000 μm, and even more preferably 2,000 μm or greater. The upper limit for the number average fiber length of the glass fiber is more preferably 5,000 μm, and even more preferably 4,500 μm. These lower limit and upper limit values for the number average fiber length of the glass fiber may be combined as desired. For example, the number average fiber length of the glass fiber is more preferably at least 1,000 μm but not more than 5,000 μm, and even more preferably at least 2,000 μm but not more than 4,500 μm.

The fiber diameter (single fiber diameter) of the glass fiber that represents the raw material supplied to melt kneading is preferably at least 5 μm but not more than 20 μm. When the fiber diameter of the glass fiber is at least 5 μm, the reinforcing effect on the obtained molded article is suitably high. Further, when the fiber diameter of the glass fiber is not more than 20 μm, the melt fluidity of the liquid crystal polyester resin composition is suitably favorable.

The lower limit for the fiber diameter of the glass fiber that represents the raw material supplied to melt kneading is more preferably 6 μm. Further, the upper limit for the fiber diameter of the glass fiber is more preferably 17 μm, and even more preferably 15 μm. The lower limit and upper limit values for the average fiber diameter of the glass fiber may be combined as desired. For example, the average fiber diameter of the glass fiber is more preferably at least 6 μm but not more than 17 μm, and even more preferably at least 6 μm but not more than 15 μm.

The glass fiber diameter does not substantially change following melt kneading.

In this description, unless specifically stated otherwise, the "number average fiber length of the glass fiber that represents the raw material" means the value measured using the method disclosed in JIS R3420 "7.8 Length of Chopped Strands". Specifically, 20 glass fibers are extracted from a sample of the glass fiber of at least 10 g and measured using a length meter having minimum scale of 0.5 mm or less, the average of the measured values is calculated, and the average rounded to one decimal place is used as the number average fiber length of the glass fiber that represents the raw material.

Further, unless specifically stated otherwise, the "fiber diameter of the glass fiber that represents the raw material" means the value measured using "method A" from among the methods disclosed in JIS R3420 "7.6 Single Fiber Diameter". Specifically, glass fiber placed in a liquid having a different refractive index from glass, and the contours of the glass fiber are observed to measure the fiber diameter.

(Plate-Like Filler)

Examples of the plate-like filler include talc, mica, graphite, wollastonite, glass flakes, barium sulfate and calcium carbonate. The mica may be muscovite, phlogopite, fluorphlogopite or tetrasilic mica.

Among the plate-like fillers listed above, talc or mica is preferable, and talc is more preferable. By including talc or mica in the liquid crystal polyester resin composition of the present embodiment, warping of the molded article can be reduced, and the heat resistance and hardness of the molded article can be improved.

<<Talc>>

The talc used in the present embodiment is a ground product of a mineral composed of magnesium hydroxide and silicate minerals. Further, the talc used in the present embodiment has a structure in which an octahedral structure formed from three magnesium (Mg) oxides or hydroxides is sandwiched between four tetrahedral structures formed from oxides of four silicon atoms (Si).

Examples of the method for producing the talc used in the present embodiment include conventional production methods, including dry grinding methods such as milling grinding methods using a roller mill or Raymond mill, impact grinding methods using an atomizer, hammer mill, or micro mill or the like, and collision grinding methods using a jet mill or ball mill or the like.

Further, a wet grinding method in which the ground talc powder is dispersed in water to form a slurry having a viscosity capable of flowing, and grinding is then performed using a ball mill, beads mill, wet jet mill, or discoplex or the like may also be used. Among the above production methods, a wet grinding method is preferable in terms of lower costs and ease of availability.

The surface of the talc may be treated with a coupling agent or the like for the purpose of improving the wettability between the talc and the resin (the liquid crystal polyester resin). Further, a talc that has been subjected to a heat treatment may be used for the purpose of removing impurities and increasing the talc hardness. Furthermore, in order to improve the handling properties, a compressed talc may also be used.

(Sieve Residues)

The talc preferably has a 45 μm sieve residue of not more than 1.0% by mass relative to the total mass of the talc. Provided this sieve residue is not more than 1.0% by mass, blockages in thin-wall portions during molding can be suppressed, the moldability can be improved, and the thin-wall strength can be improved. The 45 μm sieve residue contained within the talc, relative to the total mass of the talc, is preferably not more than 0.8% by mass, and more preferably 0.6% or less.

In this description, the 45 μm sieve residue for the talc is the value measured in accordance with JIS K 5101-14-1 "Test methods for pigments—Part 14: Determination of residue on sieve—Section 1: Water method (Manual procedure)". Specifically, the 45 μm sieve residue is measured as follows. A sample of a mass sufficient to obtain an adequate sieve residue is weighed in units of 0.1 g into a beaker of suitable capacity and then dispersed in a suitable amount of water (about 300 to 600 ml). The dispersion is then poured onto a sieve having a 45 μm aperture. Using a wash bottle containing the solution used for dispersing the sample, the beaker is washed thoroughly, and all of the wash liquid is passed through the sieve. Washing is continued with the same solution until the wash liquid that has passed through the sieve is transparent and contains no dispersed matter. The residue is washed into a preheated and weighed sintered glass crucible, dried in a dryer at 105±2° C. for one hour, cooled in a desiccator, and then weighed to an accuracy of 1 mg. The mass of the residue is then calculated.

(Ignition Loss)

The talc has an ignition loss (Ig. Loss) that is preferably not more than 7% by mass, more preferably not more than 6% by mass, and particularly preferably 5% by mass or less. The lower the Ig. Loss, the better decomposition of the liquid crystal polyester resin is suppressed, and the less likely blistering is to occur. In the present invention, the Ig. Loss is deemed the value measured in accordance with JIS M8853. Specifically, a platinum crucible and lid are heated intensely at 1,025±25° C. for 30 minutes and then cooled in a desiccator to normal temperature, and the mass is then weighed. Subsequently, a sample of 1.00 mg is weighed into the crucible with the lid, and the mass is once again weighed. With the lid half open, the sample is initially heated at low temperature, the temperature is then gradually raised to 1,025±25° C., ignition is performed at this temperature for 60 minutes, the lid of the crucible is then fully opened, and following cooling to normal temperature in a desiccator, the mass is remeasured. The ratio of the difference between the mass of the sample before ignition and the mass of the sample after ignition relative to the total mass of the sample before ignition is calculated as the ignition loss.

<<Mica>>

Mica is a ground product of a silicate mineral containing aluminum, potassium, magnesium, sodium and iron and the like. Further, mica is a mineral that forms a structure in which an octahedral structure formed from two or three metal oxides or hydroxides is sandwiched between four tetrahedral structures formed from oxides of three silicon atoms (Si) and one aluminum atom (Al).

The mica used in the present embodiment may be any one of muscovite, phlogopite, fluorphlogopite, tetrasilic mica or artificially produced synthetic mica. A combination of two or more of these micas may also be used.

The mica used in the present embodiment is preferably composed substantially of muscovite.

Examples of the method used for producing the mica used in the present embodiment include water jet grinding, wet grinding, dry ball mill grinding, pressurized roller mill grinding, air jet mill grinding, and dry grinding using an impact grinder such as an atomizer. Because it enables fine grinding of the mica, a mica produced using a wet grinding method is preferably used.

When a wet grinding method is conducted, the mica is dispersed in water prior to grinding. In order to enhance the dispersion efficiency of the mica prior to grinding, an additive such as a flocculation sedimentation agent or flocculant such as polyaluminum chloride, aluminum sulfate, ferrous sulfate, ferric sulfate, copperless chloride, polyiron sulfate, polyferric chloride, iron-silica inorganic polymer coagulant, ferric chloride-silica inorganic polymer coagulant, slaked lime ($Ca(OH)_2$), caustic soda (NaOH) or soda ash ($Na_2CO_3$) is typically added. However, these additives can sometimes cause degradation of the liquid crystal polyester. Accordingly, the mica used in the present embodiment is preferably a mica that has not used a flocculation sedimentation agent or flocculant during the wet grinding.

(Volume Average Particle Size)

The lower limit for the volume average particle size of the plate-like filler contained in the liquid crystal polyester resin composition of the present embodiment is preferably 5 µm. This enables warping in the obtained molded article to be reduced.

The lower limit for the volume average particle size of the plate-like filler contained in the liquid crystal polyester resin composition of the present embodiment is more preferably 5.5 µm, and even more preferably 6 µm.

Further, the upper limit for the volume average particle size of the plate-like filler is preferably 50 µm. Provided the volume average particle size of the plate-like filler is not more than 50 µm, the miscibility of the plate-like filler and the liquid crystal polyester resin is favorable, and obstruction of the flow of the liquid crystal polyester resin composition is unlikely to occur. As a result, the fluidity of the liquid crystal polyester resin composition can be more easily uniformly maintained. Accordingly, thin-wall portions or narrow-pitch lattice portions of the molded article can be more easily filled with the liquid crystal polyester resin composition.

The upper limit for the volume average particle size of the plate-like filler contained in the liquid crystal polyester resin composition of the present embodiment is more preferably 24 µm, even more preferably 20 µm, and particularly preferably 15 µm.

The upper limit and lower limit values for the volume average particle size of the plate-like filler may be combined as desired. For example, the volume average particle size of the plate-like filler is preferably at least 5 µm but not more than 50 µm, more preferably at least 5.5 µm but not more than 24 µm, and even more preferably at least 6 µm but not more than 20 µm.

In the present embodiment, the volume average particle diameter of the plate-like filler can be determined by a laser diffraction method. A scattering particle size distribution analyzer (for example, LA-950V2, manufactured by Horiba, Ltd.) may be used as the measurement apparatus, and the volume average particle size can be measured with the plate-like filler dispersed in water, under the following measurement conditions.

<Conditions>

Particle refractive index: 1.57-0.1i (talc), 1.59-0.1i (mica)

Dispersion medium: water

Dispersion medium refractive index: 1.33 (in the case of water)

(Thickness)

The lower limit for the thickness of the plate-like filler contained in the liquid crystal polyester resin composition of the present embodiment is preferably 0.10 µm, more preferably 0.20 µm, and even more preferably 0.30 µm. This enables warping in the obtained molded article to be reduced.

Further, the upper limit for the thickness of the plate-like filler contained in the liquid crystal polyester resin composition of the present embodiment is preferably 1.0 µm, more preferably 0.95 µm, and even more preferably 0.90 µm. This ensures that the plate-like filler can be dispersed uniformly in the liquid crystal polyester resin composition. As a result, the fluidity of the liquid crystal polyester resin composition can be more easily uniformly maintained. Accordingly, thin-wall portions or narrow-pitch lattice portions of the molded article can be more easily filled with the liquid crystal polyester resin composition.

The lower limit and upper limit values for the thickness of the plate-like filler may be combined as desired. For example, the thickness of the plate-like filler is preferably at least 0.10 µm but not more than 1.0 µm, more preferably at least 0.20 µm but not more than 0.95 µm, and even more preferably at least 0.30 µm but not more than 0.90 µm.

The thickness of the plate-like filler of the present embodiment is measured at a magnification of 1,000× using an electron microscope. The thickness of the plate-like filler in the present embodiment is measured by selecting ten random plate-like filler flakes that have detached into single thin flakes, and then using the average of the measured values.

[Other Components]

The liquid crystal polyester resin composition of the present embodiment may also contain one or more other components such as fillers other than the fibrous filler and the plate-like filler, additives, and resins other than the liquid crystal polyester resin, provided these other components do not impair the effects of the present invention.

The liquid crystal polyester resin composition of the present embodiment may contain a granular filler as a filler other than the fibrous filler and the plate-like filler. Further, the granular filler may be an inorganic filler or an organic filler. The amount of the filler other than the fibrous filler and the plate-like filler is preferably from 0.1 to 30% by mass relative to the total mass of the liquid crystal polyester resin composition.

Examples of inorganic granular fillers include silica, alumina, titanium oxide, glass beads, glass balloons, boron nitride, silicon carbide and calcium carbonate.

Examples of additives include the types of additives typically used in resin compositions, such as stabilizers, ultraviolet absorbers, plasticizers, flame retardants, flame retardant assistants, antistatic agents, surfactants, colorants and lubricants. The amount of these additives is typically from 0.01 to 10% by mass relative to the total mass of the liquid crystal polyester resin composition.

Examples of the stabilizers include hindered phenols, hydroquinone, phosphites, and substituted derivatives of these materials.

Examples of the ultraviolet absorbers include resorcinol, salicylates, benzotriazole, and benzophenone.

Examples of the colorants include colorants containing dyes such as nitrosine or pigments such as cadmium sulfide, phthalocyanine and carbon black.

Examples of the lubricants include stearic acid, montanic acid, esters of stearic acid and montanic acid, half esters of fatty acids and polyhydric alcohols, stearyl alcohol, stearamide, and polyethylene wax.

By also adding a mold release agent to the liquid crystal polyester resin composition of the present embodiment, the moldability can be improved. Examples of the mold release agent include montanic acid and montanic acid salts, full esters or half esters (also called partial esters) of montanic acid esters and a polyhydric alcohol, stearyl alcohol, stearamide, full esters or partial esters of stearic acid and a polyhydric alcohol, and polyethylene wax. A fatty acid ester of pentaerythritol is preferable, and an ester of stearic acid and pentaerythritol is more preferable.

The blend amount of the mold release agent per 100 parts by mass of the liquid crystal polyester is preferably from 0.1 to 0.5 parts by mass, and more preferably from 0.2 to 0.4 parts by mass. Further, the blend amount of the mold release agent relative to the total mass of the liquid crystal polyester resin composition is preferably from 0.05 to 0.5% by mass, and more preferably from 0.1 to 0.4% by mass. Provided the blend amount of the mold release agent falls within the above range, mold contamination and molded article blistering and the like tend to be less likely to occur, and a mold release effect is obtained.

Examples of the resins other than the liquid crystal polyester include thermoplastic resins other than liquid crystal polyester resins, such as polypropylenes, polyamides, polyesters other than liquid crystal polyester resins, polysulfones, polyethersulfones, polyphenylene sulfides, polyertherketones, polycarbonates, polyphenylene ethers and polyetherimides; and thermosetting resins such as phenol resins, epoxy resins, polyimide resins and cyanate resins. The amount of these resins other than the liquid crystal polyester is typically from 0 to 20 parts by mass per 100 parts by mass of the liquid crystal polyester resin.

<Method for Producing Liquid Crystal Polyester Resin Composition>

The liquid crystal polyester resin composition is preferably prepared by using an extruder to melt knead the liquid crystal polyester resin, the fillers (the fibrous filler and the plate-like filler) and any other components that are used as required, and then extrude the mixture in pellet form.

For the extruder, an apparatus having a cylinder, one or more screws disposed inside the cylinder, and one or more supply ports provided on the cylinder can be used favorably, and an apparatus that also has one or more vents provided in the cylinder can be used more favorably.

As described above, in order to control the number average fiber length of the fibrous filler contained in the liquid crystal polyester resin composition to achieve a value within a range from at least 450 μm to not more than 700 μm, the structure of the extruder used for the melt kneading and the melt kneading conditions may be altered as appropriate. An example of the case in which glass fiber is used as the fibrous filler is described below.

One example of a method for controlling the number average fiber length of the glass filler contained in the liquid crystal polyester resin composition to achieve a value within the range from at least 450 μm to not more than 700 μm is a method in which two or more types of glass fiber having different fiber lengths are blended in advance and then supplied to the extruder. Further, in another method, one glass fiber is supplied from an upstream supply port of the extruder together with the liquid crystal polyester resin, and the other glass fiber is supplied from a downstream supply port.

For example, in those cases where it is desirable that the number average fiber length of the glass filler contained in the liquid crystal polyester resin composition is controlled so as to be longer, a method may be employed in which glass fiber having long fibers is blended in a large amount than glass fiber having short fibers. Further, in another method, glass fiber having long fibers may be supplied from a downstream supply port to shorten the kneading time inside the extruder.

One possible combination of two or more types of glass fiber having different fiber lengths is a combination of milled glass fiber and chopped-strand glass fiber. Specifically, the fiber length of the milled glass fiber is preferably from 30 μm to 500 μm. Further, the fiber length of the chopped-strand glass fiber is preferably from 3 mm to 4 mm.

Further, examples of the method for using two or more types of glass fiber having different fiber lengths include a method in which pellets of a liquid crystal polyester resin composition containing milled glass fiber and pellets of a liquid crystal polyester resin composition containing chopped-strand glass fiber are blended in advance and then supplied to the extruder, and a method in which one of these pellets is supplied from an upstream supply port of the extruder, and the other pellets are supplied from a downstream supply port.

Further, another method involves adjusting the degree of breakage of the glass fibers by adjusting the shearing force acting upon the glass fibers. Examples of the method used for adjusting the shearing force include methods in which the structure of the screws is altered, and methods in which the screw rotational rate and/or the cylinder temperature is controlled. These methods may also be used to adjust the melt viscosity of the melted resin.

The liquid crystal polyester resin composition obtained in this manner preferably has properties that yield a deflection temperature under load of at least 260° C. but less than 285° C. when the liquid crystal polyester resin composition is molded to form a test piece with dimensions of 127 mm×12.7 mm×6.4 mmt and the deflection temperature under load is then measured under a load of 1.82 MPa in accordance with ASTM D648.

Provided the above deflection temperature under load is less than 285° C., then the processing temperature during molding can be lowered, and changes in the properties dependent on the heat history of the liquid crystal polyester resin composition during molding can be suppressed. As a result, stress during molding of the molded article is less likely to be concentrated, and warping of the molded article can be suppressed.

Further, provided the deflection temperature under load is at least 260° C., the rigidity and strength of the molded article are sufficiently high even at high temperature. Further, the degree of polymerization of the liquid crystal polyester resin in the molded article can be satisfactorily increased, and therefore by using the liquid crystal polyester resin composition according to the present embodiment, a molded article of high hardness can be obtained.

The liquid crystal polyester resin composition of the present embodiment preferably has properties that yield a Rockwell hardness of at least 108 but not more than 115 when a test piece prepared by molding the liquid crystal polyester resin composition is subjected to measurement of the Rockwell hardness using the R scale in accordance with ASTM D785.

The liquid crystal polyester resin composition of the present embodiment preferably has properties that yield an amount of warping of not more than 0.1 mm when a connector molded using the method described in the examples is subjected to measurement of the amount of warping using the method described in the examples. The lower limit for this amount of warping is preferably as low as possible, and for example, 0 mm is particularly preferable.

By using the liquid crystal polyester resin composition having the composition described above, a liquid crystal polyester resin composition can be obtained which exhibits excellent thin-wall fluidity and is capable of producing a molded article having little warping and superior hardness.

<Molded Article>

The molded article of the present embodiment uses the liquid crystal polyester resin composition described above as a forming material.

The molding method for the liquid crystal polyester resin composition of the present embodiment is preferably a melt molding method.

Examples of this method include injection molding methods, extrusion molding methods such as T-die methods and inflation methods, compression molding methods, blow molding methods, vacuum molding methods, and press molding methods. Among these, injection molding methods are preferred.

Examples of the products or components that represent molded articles of the liquid crystal polyester resin composition include electrical components, electronic components and optical components. Specific examples include IMM, DDR, CPU sockets, S/O, DIMM, connectors such as board-to-board connectors, FPC connectors and card connectors, sockets, relay components such as relay cases, relay bases, relay sprues and relay armatures, optical pickup bobbins, coil bobbins such as trans bobbins, oscillators, printed circuit boards, circuit substrates, semiconductor packages, computer-related components, camera lens barrels, optical sensor cases, compact camera module cases (packages, lens barrels), projector optical engine constituent materials, IC trays, and components related to semiconductor production processes such as wafer carriers; components for household electrical appliances such as VTR, televisions, irons, air conditioners, stereos, vacuum cleaners, refrigerators, rice cookers and lighting fixtures; lighting fixture components such as lamp reflectors, LED reflectors and lamp holders; components for audio equipment such as compact discs and laser discs (registered trademarks) and speakers; and components for communication equipment such as optical cable ferrules, telephone components, facsimile components and modems.

Further, other examples include components for copiers and printers such as separation claws and heater holders; mechanical components such as impellers, fan gears, gears, bearings, motor components and cases; components for automobiles and vehicles such as components for vehicle mechanisms, various pipes for fuel systems, exhaust systems and air intake systems, various sensors for exhaust gases, cooling water, and oil temperature systems, thermostat bases for air conditioners, motor insulators for air conditioners, brush holders for radiator motors, components for wiper motors, distributors, starter switches, starter relays, wire harnesses for transmissions, air conditioning panel switch substrates, coils for electromagnetic valves for fuel systems, fuse connectors, ECU connectors, horn terminals, electrical component insulating plates, lamp sockets, lamp reflectors, lamp housings, brake pistons, solenoid bobbins, engine oil filters, and ignition device cases; cooking utensils such as cooking pots for microwave use and heat-resistant tableware; construction materials or building materials such as thermal insulation materials or soundproofing materials for flooring materials or wall materials, support materials such as beams and pillars, and roofing materials; components for aircraft, spacecraft and space equipment; radiation facility components such as atomic reactors; marine facility components; cleaning tools; optical equipment components; valves; pipes; nozzles; filters; films; medical equipment components and medical materials; sensor components; sanitary components; sports goods; and leisure goods.

The liquid crystal polyester resin composition of the present embodiment exhibits excellent thin-wall fluidity and yields molded articles having superior hardness. By utilizing these properties, molded articles obtained using the liquid crystal polyester resin composition of the present embodiment can be used favorably for sensors, bobbins, connectors, sockets, relays and switches, and particularly for components having a thin-wall portion of 0.2 mm or smaller, and are preferably used as connectors.

With a molded article having the type of composition described above, because the liquid crystal polyester resin composition described above is used, a molded article of superior hardness can be obtained.

Another aspect of the liquid crystal polyester resin composition of the present invention includes a liquid crystal polyester resin and a filler composed of a fibrous filler and a plate-like filler, in which the amount of the filler is at least 33 parts by mass but not more than 47 parts by mass per 100 parts by mass of the liquid crystal polyester resin, the number average fiber length of the fibrous filler is at least 450 μm but not more than 590 μm, and the ratio (W1/W2) between the fibrous filler content (W1) and the plate-like filler content (W2) is at least 0.5 but not more than 1.7.

In the liquid crystal polyester resin composition described above, the volume average particle size of the plate-like filler may be at least 6 μm but not more than 20 μm.

In the liquid crystal polyester resin composition described above, the liquid crystal polyester resin may be obtained by copolymerizing 4-hydroxybenzoic acid, terephthalic acid, isophthalic acid and 4,4'-dihydroxybiphenyl as monomers, in which the amount of the 4-hydroxybenzoic acid may be from 55 to 65 mol % relative to the total number of moles of the monomers, the amount of the terephthalic acid may be from 10 to 17 mol % relative to the total number of moles of the monomers, the amount of the isophthalic acid may be from 3 to 10 mol % relative to the total number of moles of the monomers, and the amount of the 4,4'-dihydroxybiphenyl may be from 15 to 25 mol % relative to the total number of moles of the monomers.

EXAMPLES

The present invention is described below using a series of examples, but the present invention is in no way limited by these examples. Each measurement was conducted in the manner described below.

<Liquid Crystal Polyester Resin Flow Start Temperature>

Using a flow tester (CFT-500 EX model, manufactured by Shimadzu Corporation), about 2 g of the liquid crystal polyester resin was placed in a cylinder fitted with a die having a nozzle with an inner diameter of 1 mm and a length of 10 mm, and under a load of 9.8 MPa, the liquid crystal polyester resin was melted and extruded from the nozzle while the temperature was raised at a rate of temperature increase of 4° C./minute, and the temperature that yielded a viscosity of 4,800 Pa·s (48,000 poise) was measured.

<Number Average Fiber Length of Fibrous Filler in Liquid Crystal Polyester Resin Composition>

First, 5 g of pellets formed from the liquid crystal polyester resin composition of the present embodiment were heated in a muffle furnace (FP410, manufactured by Yamato Scientific Co., Ltd.) under an air atmosphere at 600° C. for 4 hours to remove the resin. The thus obtained ashed residue containing the fibrous filler was then dispersed in an ethylene glycol solution and irradiated with ultrasonic waves for 3 minutes. Next, several drops of the dispersion were dripped onto a slide glass, and the fibrous filler was disentangled to ensure the fibers of the fibrous filler did not overlap on the slide glass. A cover glass was then placed on top of the disentangled fibrous filler, and a video microscope (VHX-1000, manufactured by Keyence Corporation) was adjusted at a magnification of 100× to ensure that the contours of the fibrous filler were in focus. The lengths of 500 fibers of the fibrous filler were measured, and the average fiber length was calculated.

[A] Production of Liquid Crystal Polyester Resins

Production Example 1 (Liquid Crystal Polyester Resin [A-1])

A reactor fitted with a stirring device, a torque meter, a nitrogen gas inlet tube, a thermometer and a reflux condenser was charged with 994.5 g (7.2 mol) of 4-hydroxybenzoic acid, 446.9 g (2.4 mol) of 4,4'-dihydroxybiphenyl, 299.0 g (1.8 mol) of terephthalic acid, 99.7 g (0.6 mol) of isophthalic acid and 1,347.6 g (13.2 mol) of acetic anhydride, 0.2 g of 1-methylimidazole was added as a catalyst, and the inside of the reactor was flushed thoroughly with nitrogen.

Subsequently, the contents were stirred under a stream of nitrogen gas while the temperature was raised from room temperature to 150° C. over a period of 30 minutes, and the reaction mixture was then refluxed at that temperature for 30 minutes.

Next, 2.4 g of 1-methylimidazole was added. The temperature was then raised from 150° C. to 320° C. over a period of 2 hours and 50 minutes while by-product acetic acid and unreacted acetic anhydride were removed by distillation. After holding the temperature at 320° C. for 30 minutes, the contents were removed from the reactor and cooled to room temperature.

The obtained solid was then ground with a grinder to a particle size of 0.1 to 1 mm, and the ground product was heated, under an atmosphere of nitrogen gas, from room temperature to 250° C. over a period of one hour and then from 250° C. to 296° C. over a period of 5 hours, and was then held at 296° C. for 3 hours to effect a solid phase polymerization. Following the solid phase polymerization, the product was cooled to obtain a powdered liquid crystal polyester [A-1]. The flow start temperature of the obtained liquid crystal polyester resin [A-1] was 328° C.

Production Example 2 (Liquid Crystal Polyester Resin [A-2])

A reactor fitted with a stirring device, a torque meter, a nitrogen gas inlet tube, a thermometer and a reflux condenser was charged with 994.5 g (7.2 mol) of 4-hydroxybenzoic acid, 446.9 g (2.4 mol) of 4,4'-dihydroxybiphenyl, 239.2 g (1.44 mol) of terephthalic acid, 159.5 g (0.96 mol) of isophthalic acid and 1,347.6 g (13.2 mol) of acetic anhydride, 0.2 g of 1-methylimidazole was added as a catalyst, and the inside of the reactor was flushed thoroughly with nitrogen.

Subsequently, the contents were stirred under a stream of nitrogen gas while the temperature was raised from room temperature to 150° C. over a period of 30 minutes, and the reaction mixture was then refluxed at that temperature for 30 minutes.

Next, 0.9 g of 1-methylimidazole was added, the temperature was raised from 150° C. to 320° C. over a period of 2 hours and 50 minutes while by-product acetic acid and unreacted acetic anhydride were removed by distillation, and after holding the temperature at 320° C. for 30 minutes, the contents were removed from the reactor and cooled to room temperature.

The obtained solid was then ground with a grinder to a particle size of 0.1 to 1 mm, and the ground product was heated, under an atmosphere of nitrogen gas, from room temperature to 220° C. over a period of one hour and then from 220° C. to 241° C. over a period of 0.5 hours, and was then held at 241° C. for 10 hours to effect a solid phase polymerization. Following the solid phase polymerization, the product was cooled to obtain a powdered liquid crystal polyester [A-2]. The flow start temperature of the obtained liquid crystal polyester resin [A-2] was 292° C.

Further, in the following examples and comparative examples, the following commercially available products were used as fillers.

[B] Fibrous Fillers

[B-1] Chopped glass fiber (CS3J260S, manufactured by Nitto Boseki Co., Ltd., number average fiber diameter: 10.5 μm, number average fiber length: 3 mm)

[B-2] Milled glass fiber (EFH75-01, manufactured by Central Glass Co., Ltd., number average fiber diameter: 10 μm, number average fiber length: 75 μm)

[B-3] Milled glass fiber (SS10-404, manufactured by Nitto Boseki Co., Ltd., number average fiber diameter: 10 μm, number average fiber length: 300 μm)

<[C] Plate-Like Fillers>

[C-1] Talc (GH7, manufactured by Hayashi Kasei Co., Ltd., volume average particle size: 7 μm, 45 μm sieve residue: 0% by mass (total passage through sieve), Ig. Loss: 4.7% by mass, thickness: 0.65 μtm)

[C-2] Talc (Rose K, manufactured by Nippon Talc Co., Ltd. volume average particle size: 15 μm, 45 μm sieve residue: 0.02% by mass, Ig. Loss: 5.0% by mass, thickness: 0.90 Inn)

[C-3] Mica (Y-1800, manufactured by Yamaguchi Mica Co., Ltd. volume average particle size: 11 μm, thickness: 0.40 μm)

[C-4] Mica (AB-25S, manufactured by Yamaguchi Mica Co., Ltd. volume average particle size: 24 μm, thickness: 0.45 μm)

Further, in the following examples, the following materials were used.

Mold release agent: LOXIOL VPG861 (manufactured by Emery Oleochemicals Japan Ltd.), 5% weight loss temperature: 310° C.

The above mold release agent is a mixture of the full ester (tetrastearate) and partial esters of pentaerythritol and stearic acid.

Production of Liquid Crystal Polyester Resin Compositions

Examples 1 to 7, Comparative Examples 1 to 9

A liquid crystal polyester resin [A], a fibrous filler [B], a plate-like filler [C] and the mold release agent were subjected to melt kneading in the proportions shown in Table 1 and Table 3 using a twin-screw extruder (PCM-30, manufactured by Ikegai, Ltd.) with the cylinder temperature set to 340° C., thus obtaining a series of pelletized liquid crystal polyester resin compositions. The proportions shown in Table 1 and Table 3 all represent parts by mass.

Each of the pelletized liquid crystal polyester resin compositions of Examples 1 to 7 and Comparative Examples 1 to 9 was subjected to hot air drying at 130° C. for 4 hours, and was then evaluated using the following methods. The results are shown in Table 2 and Table 4.

<<Evaluations 1>>
<Thin-Wall Flow Length of Liquid Crystal Polyester Resin Composition>

Using a mold illustrated in FIG. 1 for measuring the thin-wall flow length at a thickness of 0.2 mm, the liquid crystal polyester resin composition was molded using an injection molding machine (Roboshot S2000i-30B, manufactured by FANUC Corporation) under the following conditions. The length of the removed molded article in the resin flow direction was measured. This test was conducted for five molded articles, and the average value was deemed the thin-wall flow length.

[Conditions]
Cylinder temperature: (nozzle side) 350° C., 350° C., 330° C., 310° C., 280° C., 80° C. (hopper side)
Mold temperature: 120° C.
Measured value: 20 mm
Injection speed: 200 mm/second
VP switch: pressure switch at 100 MPa, 150 MPa
Holding pressure: 20 MPa <Load Deflection Temperature>

The liquid crystal polyester resin composition was molded into a test piece of 127 mm×12.7 mm×6.4 mmt using an injection molding machine (PNX40-5A, manufactured by Nissei Plastic Industrial Co., Ltd.) at a molding temperature of 350° C., a mold temperature of 130° C. and an injection speed of 50%. Using this test piece, two measurements were performed in accordance with ASTM D648, under a load of 1.82 MPa at a rate of temperature increase of 4° C./minute, and the average value of these measurements was employed.

<Rockwell Hardness>

A test piece prepared by molding the liquid crystal polyester resin composition was measured for Rockwell hardness in accordance with ASTM D785. First, the liquid crystal polyester resin composition was molded into a test piece of 12.7 mm×6.4 mm×6.4 mmt using an injection molding machine (PNX40-5A, manufactured by Nissei Plastic Industrial Co., Ltd.) at a molding temperature of 350° C., a mold temperature of 130° C. and an injection speed of 50%.

Using this test piece, three measurements were performed using a Rockwell hardness meter (FR-1E, manufactured by Toyo Seiki Seisaku-sho, Ltd.) using the R scale (steel sphere of diameter 12.7 mm), and the average value of these measurements was employed.

<Thin-Wall Weld Strength>

Figure 2:
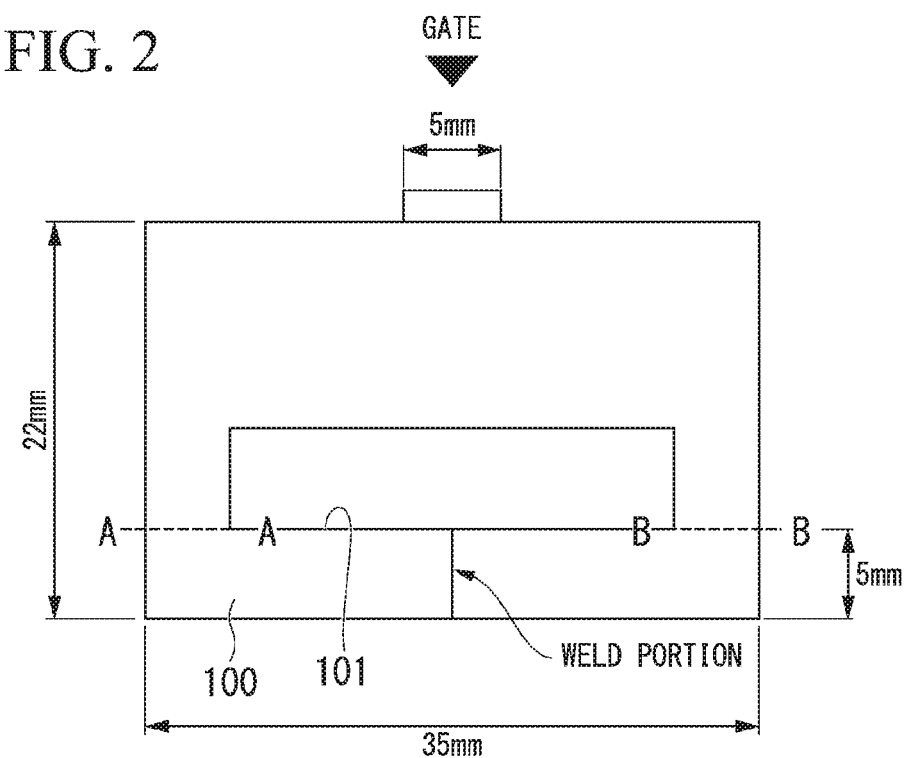
FIG. 2 is a plan view illustrating a cavity of a mold used for measuring weld strength in the examples.

FIG. 2 is a plan view illustrating the cavity of a mold used for measuring weld strength in the examples. The cavity illustrated in FIG. 2 has a thickness in the vicinity of the weld portion of 0.3 mm. Further, a film gate of 5 mm×0.3 mm is provided in the end of the mold. Using this mold, the liquid crystal polyester resin composition was molded using an injection molding machine (Robo shot 52000i-30B, manufactured by FANUC Corporation) under the following conditions. The thus obtained molded article with a thickness of 0.3 mm was cut along the line A-A and the line B-B that represent an extension of the edge 101, thus producing a test piece 100 of 5 mm×35 mm. A three-point bending test of the weld portion of this test piece 100 was conducted 5 times using a precision load measuring device (Model 1605IIVL, manufactured by Aikoh Engineering Co., Ltd.) under conditions including a test speed of 10 mm/minute, a distance between supports of 5 mm and an indenter width of 1 mm, and the average value of the measured bending stress values was deemed the thin-wall weld strength.

[Conditions]
Cylinder temperature: (nozzle side) 350° C., 350° C., 330° C., 310° C., 280° C., 80° C. (hopper side)
Mold temperature: 120° C.
Measured value: 20 mm
Injection speed: 200 mm/second
VP switch: pressure switch at 100 MPa, 150 MPa
Holding pressure: 20 MPa <Production of Connectors>

Figure 3A:
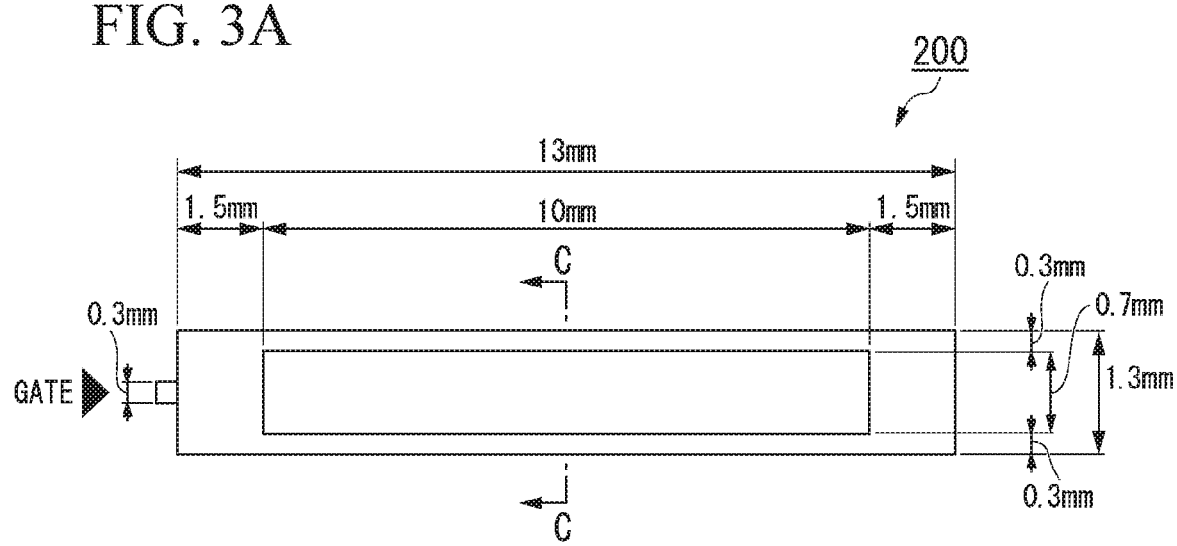
FIG. 3A is a schematic top view of a connector 200 produced in the examples.
Figure 3B:
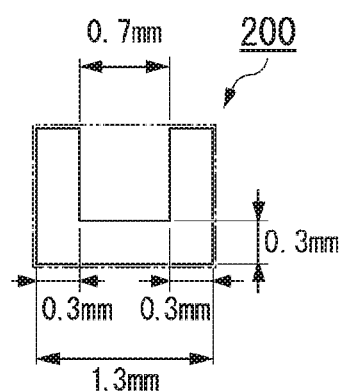
FIG. 3B is a schematic cross-sectional view along the C-C plane of FIG. 3A of the connector 200 produced in the examples.
Figure 3C:
FIG. 3C is a schematic side view of the connector 200 produced in the examples.

FIGS. 3A to 3C are schematic views of a connector 200 produced in the examples. FIG. 3A is a top view of the connector 200, FIG. 3B is a cross-sectional view of the connector 200 along the C-C plane of FIG. 3A, and FIG. 3C is a front view of the connector 200.

Using each of the pelletized liquid crystal polyester resin compositions obtained in the manner described above, molding was performed using an injection molding machine (Roboshot 52000i-30B, manufactured by FANUC Corporation) under the following conditions to produce the connector 200 illustrated in FIG. 3.

[Molding Conditions for Connector 200]
Cylinder temperature: (nozzle side) 350° C., 360° C., 340° C., 320° C., 80° C. (hopper side)
Mold temperature: 90° C.
Measured value: 9.5 mm
Screw rotational rate: 200 rpm
Back pressure: 2 MPa
Injection speed: 300 mm/second
Cooling time: 1.8 seconds
Suck-back distance: 2 mm
Holding pressure: 20 MPa
Holding time: 0.15 seconds <<Evaluations 2>>

<Filling Pressure During Molding of Connector 200>

The connector 200 illustrated in FIG. 3A to FIG. 3C was injection molded under the above molding conditions, the injection peak pressure required for the liquid crystal polyester resin composition to completely fill the mold used for molding the connector 200 was measured five times, and the average value of these five measurements was deemed the filling pressure.

<Destructive Test of Connector>

Figure 4:
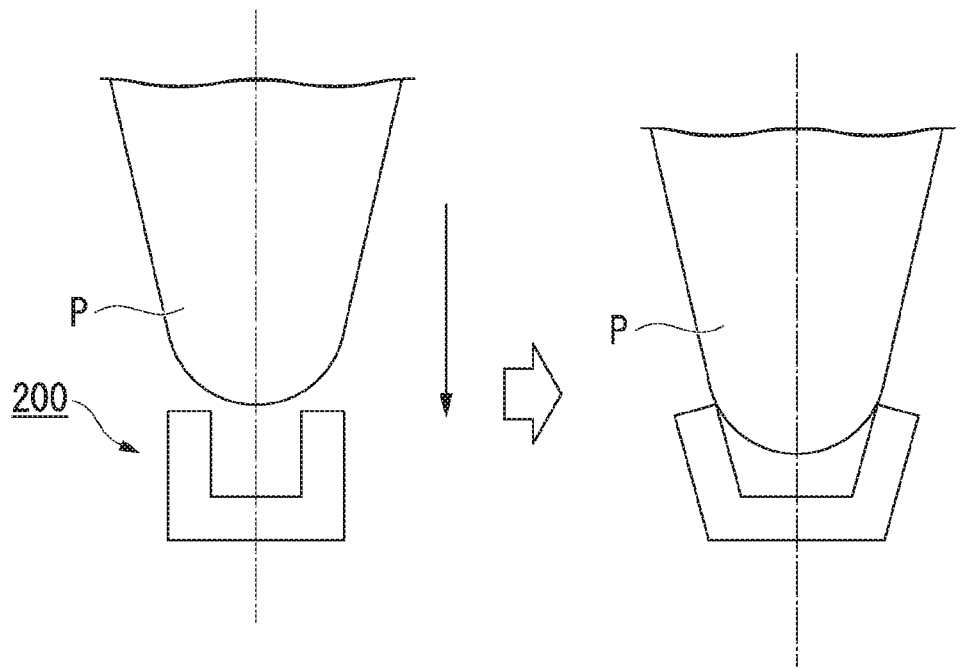
FIG. 4 is a diagram illustrating a destructive test of the connector 200 in the examples.

FIG. 4 is a diagram illustrating a destructive test of the connector 200 in the examples. Using a precision load measuring device (Model 1605IIVL, manufactured by Aikoh Engineering Co., Ltd.), a destructive test of the connector 200 was performed using the method illustrated in FIG. 4. In this test, an indenter P having a radius of curvature of 0.65 mm at the tip was used. The indenter was positioned so that the center of this indenter P and the point of intersection between centerline of the connector 200 in the width direction and the centerline of the connector 200 in the length direction overlapped when viewed in plan view. Then, under conditions including a test speed of 2 mm/minute, the connector 200 was destroyed in the manner illustrated in FIG. 4. The maximum load at this time was measured five times, and the average value of the five measurements was determined.

<Amount of Warping of Connector 200>

Figure 5:
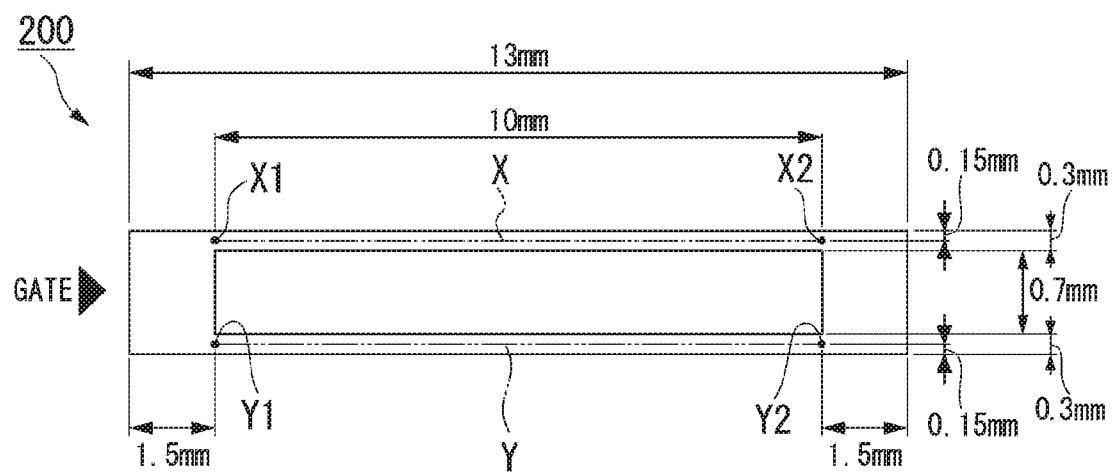
FIG. 5 is a diagram illustrating the measurement location for the amount of warping of the connector 200 in the examples.

FIG. 5 is a diagram illustrating the measurement location for the amount of warping of the connector 200 in the examples. The amount of warping of the obtained connector 200 was measured using a flatness measurement module (Core 9030C, manufactured by Cores Corporation). The connector 200 was placed on a glass substrate at room temperature, and the distance between the bottom surface (substrate-side surface) of the connector 200 and the glass substrate was measured at 100 points at 0.1 mm intervals along the line X between a point X1 at one end of the connector 200 and a point X2 at the other end. In a similar manner, the distance between the bottom surface (substrate-side surface) of the connector 200 and the glass substrate was measured at 100 points at 0.1 mm intervals along the line Y between a point Y1 at one end of the connector 200 and a point Y2 at the other end. In this manner, the height of the connector 200 from the glass substrate was measured at a total of 200 points. These measurements were performed for five connectors.

Next, the least squares method was used to calculate a least squares plane for the connector 200.

Subsequently, the height position of the least squares plane was moved in a parallel manner so as to include the point having the lowest height among all 200 points. The distance from the least squares plane following parallel movement to the point having the highest height among the 200 points was calculated as the amount of warping. During the calculation of the amount of warping, the movement average was calculated using an average number of 1, a number of loops of 1, and without end-point compensation, removing only dramatically offset measurement points.

<Blister Test of Connector 200>

The connector 200 was placed on a hot plate set to 260° C. for three minutes, and the presence of blisters having a size of 0.1 mm or greater was confirmed visually. This test was conducted for 20 connectors 200, and the number of connectors 200 on which blisters occurred was measured. In this test, it can be stated that a smaller number of connectors with blisters indicates more favorable blister resistance.

The liquid crystal polyester resin compositions of Examples 1 to 7 and Comparative Examples 1 to 9 were given an overall evaluation based on the following criteria. Compositions that satisfies all of the following (i) to (iii) were evaluated as "O", whereas compositions which did not satisfy any one of (i) to (iii) were evaluated as "x"

(i) filling is possible
(ii) Rockwell hardness is at least 108
(iii) Amount of warping of the connector 200 is not more than 0.1 mm

TABLE 1

| | | Example 1 | Example 2 | Example 3 | Example 4 | Example 5 | Example 6 | Example 7 |
|---|---|---|---|---|---|---|---|---|
| [A] LCP | [A-1] | 55 | 55 | 30 | 55 | 55 | 55 | 55 |
| | [A-2] | 45 | 45 | 70 | 45 | 45 | 45 | 45 |
| [B] Fibrous filler | [B-1] | 21.6 | 17.5 | 21.6 | 17.6 | 17.5 | 13.5 | 23.5 |
| | [B-2] | — | — | — | — | — | — | — |
| | [B-3] | — | — | — | — | — | — | — |
| [C] Plate-like filler | [C-1] | 13.5 | 17.5 | 13.5 | 13.5 | — | 21.6 | 22.1 |
| | [C-2] | — | — | — | 4 | — | — | — |
| | [C-3] | — | — | — | — | 17.5 | — | — |
| | [C-4] | — | — | — | — | — | — | — |
| Total amount of filler ([B] + [C]) | | 35.1 | 35 | 35.1 | 35.1 | 35 | 35.1 | 45.6 |
| Filler ratio ([B]/[C]) | | 1.6 | 1.0 | 1.6 | 1.0 | 1.0 | 0.6 | 1.1 |
| [D] mold release agent | | 0.4 | 0.4 | 0.4 | 0.4 | 0.4 | 0.4 | 0.4 |
| Number average fiber length of fibrous filler [μm] | | 559 | 551 | 542 | 463 | 455 | 577 | 471 |

TABLE 2

|  | | Example 1 | Example 2 | Example 3 | Example 4 | Example 5 | Example 6 | Example 7 |
|---|---|---|---|---|---|---|---|---|
| <<Evaluations 1>> | | | | | | | | |
| Thin-wall flow length [mm] | 100 MPa | 37 | 36 | 44 | 36 | 35 | 36 | 33 |
|  | 150 MPa | 57 | 55 | 69 | 57 | 53 | 58 | 49 |
| Deflection temperature under load [° C.] | | 269 | 265 | 260 | 272 | 272 | 265 | 270 |
| Rockwell hardness | | 112 | 111 | 109 | 111 | 109 | 108 | 111 |
| Thin-wall weld strength [MPa] | | 41 | 42 | 43 | 43 | 36 | 36 | 39 |
| <<Evaluations 2>> | | | | | | | | |
| Filling pressure [MPa] | | 239 | 230 | 210 | 229 | 235 | 228 | 240 |
| Amount of warping [mm] | | 0.07 | 0.04 | 0.05 | 0.03 | 0.06 | 0.05 | 0.09 |
| Blister test [number] | | 0 | 0 | 0 | 0 | 1 | 0 | 0 |
| Destructive test [N] | | 4.8 | 4.7 | 4.6 | 4.7 | 4.6 | 4.5 | 4.7 |
| Overall evaluation | | ○ | ○ | ○ | ○ | ○ | ○ | ○ |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| [A] LCP | [A-1] | 55 | 100 | 55 | 55 | 55 | 55 | 55 | 55 | 55 |
|  | [A-2] | 45 | — | 45 | 45 | 45 | 45 | 45 | 45 | 45 |
| [B] Fibrous filler | [B-1] | 16.6 | 28.1 | 33 | — | — | — | — | — | — |
|  | [B-2] | — | — | — | 33 | — | — | — | — | — |
|  | [B-3] | — | — | — | — | 33 | — | — | — | — |
| [C] Plate-like filler | [C-1] | 16.6 | 28.1 | — | — | — | 33 | — | — | — |
|  | [C-2] | — | — | — | — | — | — | 33 | — | — |
|  | [C-3] | — | — | — | — | — | — | — | 33 | — |
|  | [C-4] | — | — | — | — | — | — | — | — | 33 |
| Total amount of filler ([B] + [C]) | | 33.2 | 56.2 | 33 | 33 | 33 | 33 | 33 | 33 | 33 |
| Filler ratio ([B]/[C]) | | 1.0 | 1.0 | — | — | — | 0 | 0 | 0 | 0 |
| [D] mold release agent | | 0.4 | 0.5 | 0.4 | 0.4 | 0.4 | 0.4 | 0.4 | 0.4 | 0.4 |
| Number average fiber length of fibrous filler [μm] | | 313 | 516 | 530 | 131 | 248 | — | — | — | — |

TABLE 4

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| <<Evaluations 1>> | | | | | | | | | | |
| Thin-wall flow length [mm] | 100 MPa | 38 | 31 | 33 | 40 | 38 | 35 | 39 | 44 | 45 |
|  | 150 MPa | 62 | 46 | 55 | 64 | 64 | 53 | 64 | 62 | 65 |

TABLE 4-continued

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Deflection temperature under load [° C.] | 258 | 285 | 266 | 257 | 268 | 225 | 223 | 235 | 239 |
| Rockwell hardness | 103 | 110 | 111 | 107 | 108 | 99 | 100 | 104 | 105 |
| Thin-wall weld strength [MPa] | 35 | 40 | 40 | 23 | 35 | 28 | 29 | 28 | 28 |
| <<Evaluations 2>> | | | | | | | | | |
| Filling pressure [MPa] | 220 | filling impossible | 236 | 202 | 210 | 226 | 192 | 239 | 187 |
| Amount of warping [mm] | 0.35 | — | 0.22 | 0.25 | 0.23 | 0.13 | 0.33 | 0.40 | 0.90 |
| Blister test [number] | 2 | — | 0 | 1 | 0 | 18 | 0 | 13 | 12 |
| Destructive test [N] | 4.1 | — | 4.8 | 4.2 | 4.4 | 3.9 | 3.8 | 4.0 | 4.1 |
| Overall evaluation | X | X | X | X | X | X | X | X | X |

As shown in Table 2, the liquid crystal polyester resin compositions of Examples 1 to 7 that applied the present invention exhibited excellent thin-wall fluidity, and yielded molded articles having superior hardness and little warping.

In the liquid crystal polyester resin compositions of Examples 1 to 7, the total amount of the fibrous filler [B] and the plate-like filler [C] was sufficiently low, at a value of more than 55 parts by mass. As a result, the liquid crystal polyester resin compositions of Examples 1 to 7 exhibited excellent thin-wall fluidity.

Further, in the liquid crystal polyester resin compositions of Examples 1 to 7, the number average fiber length of the fibrous filler [B] was sufficiently long, at a value of at least 450 μm. Accordingly, in the connector 200 illustrated in FIG. 3, it is surmised that the fibrous filler [B] exists from the core layer of the connector 200 through to the skin layer. As a result, in the liquid crystal polyester resin compositions of Examples 1 to 7, it is thought that a satisfactory improvement effect in the hardness due to the fibrous filler was able to be obtained.

Furthermore, it is also thought that the reinforcing effect of the fibrous filler [B] yielded a reduction in the warping of the molded article.

In contrast, as shown in Table 4, in the liquid crystal polyester resin composition of Comparative Example 2, filling was impossible, and the connector 200 illustrated in FIG. 3A to FIG. 3C could not be obtained. Further, although the liquid crystal polyester resin compositions of Comparative Example 1, Comparative Example 4 and Comparative Examples 6 to 9 exhibited excellent thin-wall fluidity, the hardness of the molded article was poor, and the amount of warping was large. Moreover, the liquid crystal polyester resin compositions of Comparative Example 3 and Comparative Example 5 exhibited excellent thin-wall fluidity and yielded molded articles of superior hardness, but the amount of warping of the molded article was large.

The above results confirmed that the present invention is very useful.

INDUSTRIAL APPLICABILITY

The present invention can provide a liquid crystal polyester resin composition that has excellent thin-wall fluidity and is capable of producing a molded article having little warping and superior hardness.

The invention claimed is:

1. A liquid crystal polyester resin composition comprising:
   a liquid crystal polyester resin; and
   a filler composed of a fibrous filler and a plate filler, wherein
   an amount of the filler is at least 15 parts by mass but not more than 55 parts by mass per 100 parts by mass of the liquid crystal polyester resin, and
   a number average fiber length of the fibrous filler is at least 450 μm but not more than 700 μm.

2. The liquid crystal polyester resin composition according to claim 1, wherein a deflection temperature under load, measured in accordance with ASTM D648 under a load of 1.82 MPa using a test piece prepared by molding the liquid crystal polyester resin composition, is at least 260° C. but less than 285° C.

3. The liquid crystal polyester resin composition according to claim 1, wherein a Rockwell hardness, measured using an R scale in accordance with ASTM D785 using a test piece prepared by molding the liquid crystal polyester resin composition, is at least 108 but not more than 115.

4. The liquid crystal polyester resin composition according to claim 1, wherein an amount of the filler is at least 24 parts by mass but not more than 45 parts by mass per 100 parts by mass of the liquid crystal polyester resin.

5. The liquid crystal polyester resin composition according to claim 1, wherein a ratio (W1/W2) between a mass (W1) of the fibrous filler and a mass (W2) of the plate filler is at least 0.5 but not more than 2.0.

6. The liquid crystal polyester resin composition according to claim 1, wherein a volume average particle size of the plate filler is at least 5 μm but not more than 50 μm.

7. The liquid crystal polyester resin composition according to claim 1, wherein the liquid crystal polyester resin is a mixture of a plurality of liquid crystal polyester resins having different flow start temperatures, and among the plurality of liquid crystal polyester resins, a flow start temperature of a first liquid crystal polyester resin having a highest flow start temperature is at least 300° C. but not more than 400° C., and a flow start temperature of a second liquid crystal polyester resin having a lowest flow start temperature is at least 260° C. but not more than 350° C.

8. A molded article molded from the liquid crystal polyester resin composition according to claim 1.

9. The liquid crystal polyester resin composition according to claim 2, wherein a Rockwell hardness, measured using an R scale in accordance with ASTM D785 using a test piece prepared by molding the liquid crystal polyester resin composition, is at least 108 but not more than 115.

10. The liquid crystal polyester resin composition according to claim 2, wherein an amount of the filler is at least 24 parts by mass but not more than 45 parts by mass per 100 parts by mass of the liquid crystal polyester resin.

11. The liquid crystal polyester resin composition according to any one of claim 2, wherein a ratio (W1/W2) between a mass (W1) of the fibrous filler and a mass (W2) of the plate filler is at least 0.5 but not more than 2.0.

12. The liquid crystal polyester resin composition according to any one of claim 2, wherein a volume average particle size of the plate filler is at least 5 μm but not more than 50 μm.

13. The liquid crystal polyester resin composition according to claim 2, wherein the liquid crystal polyester resin is a mixture of a plurality of liquid crystal polyester resins having different flow start temperatures, and among the plurality of liquid crystal polyester resins, a flow start temperature of a first liquid crystal polyester resin having a highest flow start temperature is at least 300° C. but not more than 400° C., and a flow start temperature of a second liquid crystal polyester resin having a lowest flow start temperature is at least 260° C. but not more than 350° C.

14. A molded article molded from the liquid crystal polyester resin composition according to claim 2.

15. The liquid crystal polyester resin composition according to claim 3, wherein an amount of the filler is at least 24 parts by mass but not more than 45 parts by mass per 100 parts by mass of the liquid crystal polyester resin.

16. The liquid crystal polyester resin composition according to any one of claim 3, wherein a ratio (W1/W2) between a mass (W1) of the fibrous filler and a mass (W2) of the plate filler is at least 0.5 but not more than 2.0.

17. The liquid crystal polyester resin composition according to any one of claim 3, wherein a volume average particle size of the plate filler is at least 5 μm but not more than 50 μm.

18. The liquid crystal polyester resin composition according to claim 3, wherein the liquid crystal polyester resin is a mixture of a plurality of liquid crystal polyester resins having different flow start temperatures, and among the plurality of liquid crystal polyester resins, a flow start temperature of a first liquid crystal polyester resin having a highest flow start temperature is at least 300° C. but not more than 400° C., and a flow start temperature of a second liquid crystal polyester resin having a lowest flow start temperature is at least 260° C. but not more than 350° C.

19. A molded article molded from the liquid crystal polyester resin composition according to claim 3.

* * * * *